(12) United States Patent
Lee et al.

(10) Patent No.: US 11,606,771 B2
(45) Date of Patent: Mar. 14, 2023

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Jeongsu Lee, Seoul (KR); Hyunsu Cha, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 170 days.

(21) Appl. No.: 17/198,112

(22) Filed: Mar. 10, 2021

(65) Prior Publication Data
US 2021/0289465 A1 Sep. 16, 2021

(30) Foreign Application Priority Data

Mar. 10, 2020 (KR) .................. 10-2020-0029828
Aug. 7, 2020 (KR) .................. 10-2020-0099083

(51) Int. Cl.
*H04W 64/00* (2009.01)
*H04W 74/08* (2009.01)
*H04L 5/00* (2006.01)
*H04W 76/27* (2018.01)
*H04W 74/02* (2009.01)

(52) U.S. Cl.
CPC ......... *H04W 64/003* (2013.01); *H04L 5/0051* (2013.01); *H04W 74/02* (2013.01); *H04W 74/0841* (2013.01); *H04W 76/27* (2018.02)

(58) Field of Classification Search
CPC ... H04W 64/003; H04W 76/27; H04W 74/02; H04W 52/02; H04W 76/10; H04W 74/0841; H04L 5/0051
See application file for complete search history.

(56) References Cited

U.S. PATENT DOCUMENTS

| | | | |
|---|---|---|---|
| 2014/0295868 A1* | 10/2014 | Lee ................ | H04W 76/27 |
| | | | 455/552.1 |
| 2015/0326995 A1* | 11/2015 | Li ................... | H04W 72/042 |
| | | | 370/329 |
| 2017/0019932 A1* | 1/2017 | Su ................... | H04W 74/0833 |
| 2018/0049154 A1* | 2/2018 | Choi ............... | H04W 48/16 |
| 2019/0349999 A1* | 11/2019 | Islam ............. | H04W 74/0833 |
| 2019/0393970 A1* | 12/2019 | Kumar ........... | H04B 17/345 |
| 2020/0236718 A1* | 7/2020 | Sundararajan ... | G01S 5/0205 |

* cited by examiner

*Primary Examiner* — Ian N Moore
*Assistant Examiner* — Latresa A McCallum
(74) *Attorney, Agent, or Firm* — Lee Hong Degerman Kang & Waimey

(57) ABSTRACT

Various embodiments relate to a next-generation wireless communication system for supporting a higher data rate beyond a $4^{th}$ generation (4G) wireless communication system. According to various embodiments, a method and apparatus for transmitting and receiving a signal in a wireless communication system may be provided. Further, various other embodiments may also be provided.

10 Claims, 24 Drawing Sheets

FIG. 5
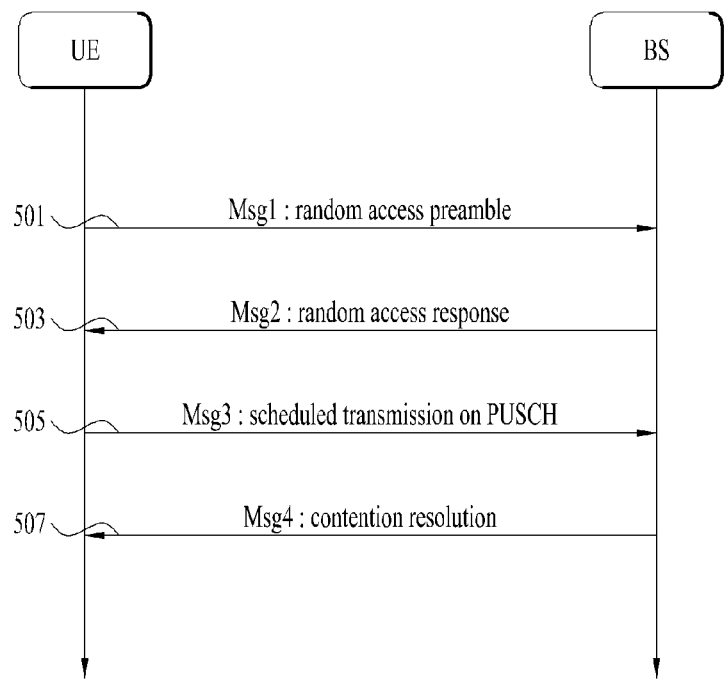
(a)
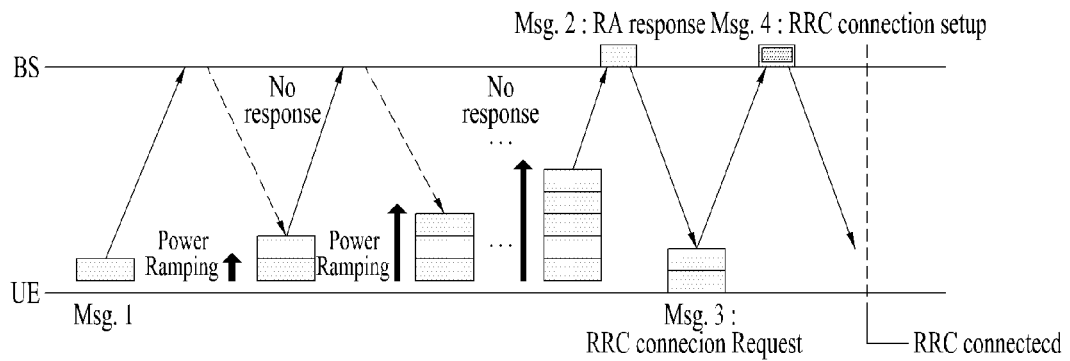
(b)

FIG. 13
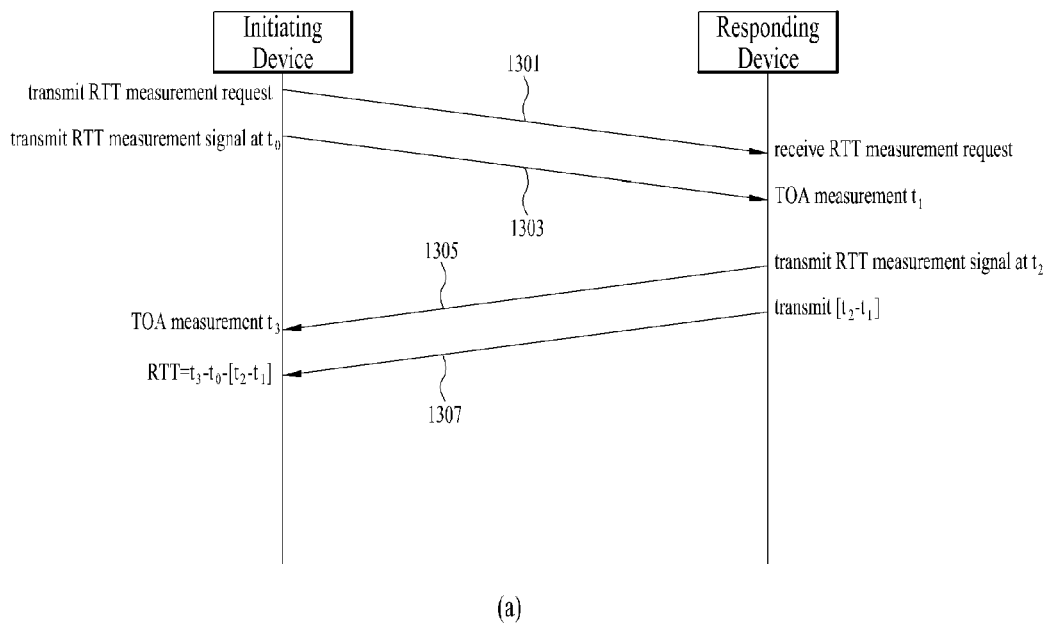
(a)
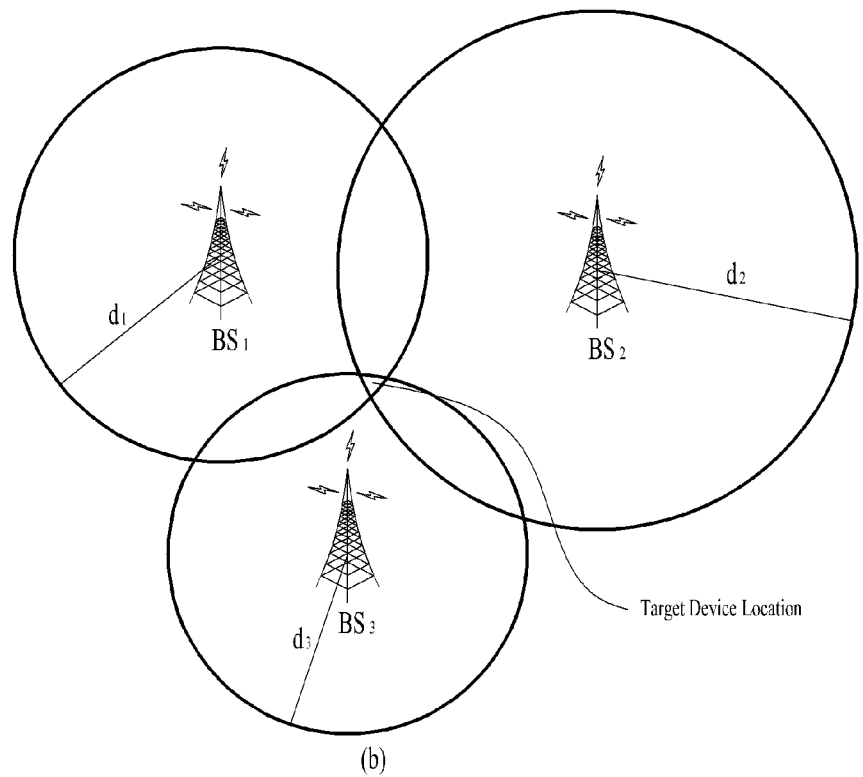
(b)

METHOD AND APPARATUS FOR TRANSMITTING AND RECEIVING SIGNAL IN WIRELESS COMMUNICATION SYSTEM

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a method and apparatus for triggering a positioning measurement operation for a user equipment (UE) in a wireless communication system.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method performed by an apparatus in a wireless communication system may be provided.

According to various embodiments, the method may include transmitting a first message related to a random access procedure, wherein the first message may include a physical random access channel (PRACH) preamble, and receiving a second message related to the random access procedure in response to the first message.

According to various embodiments, the second message may include first assistance data related to positioning.

According to various embodiments, the PRACH preamble may be included in a plurality of PRACH preambles.

According to various embodiments, the plurality of PRACH preambles may include (i) at least one first PRACH preamble configured for at least one of a contention-based random access procedure or a contention-free random access procedure, and (ii) at least one second PRACH preamble configured for the positioning.

According to various embodiments, the second message may include the first assistance data based on the PRACH preamble being included in the at least one second PRACH preamble.

According to various embodiments, information related to a total number of PRACH preambles available for the contention-based random access procedure and the contention-free random access procedure may be received in system information.

According to various embodiments, the at least one second PRACH preamble may be at least a part of at least one PRACH preamble available for other purposes except for the total number of preambles, or at least a part of PRACH preambles available for the contention-free random access procedure among the total number of PRACH preambles.

According to various embodiments, the method may further include receiving a positioning reference signal (PRS) related to the first assistance data, and transmitting a third message related to the random access procedure.

According to various embodiments, the third message may include information related to at least one measurement based on the PRS.

According to various embodiments, the third message may be transmitted based on scheduling information for the third message, included in the second message.

According to various embodiments, the apparatus may be configured in a radio resource control (RRC) idle state or RRC inactive state.

According to various embodiments, the information related to the at least one measurement based on the PRS may be based on a reporting range defined by a predetermined first resolution for the RRC idle state or RRC inactive state within a predetermined range.

According to various embodiments, a value of the first resolution may be larger than a value of a second resolution predetermined for an RRC connected state.

According to various embodiments, the method may further include receiving, in system information, second assistance data for the positioning.

According to various embodiments, the first assistance data may include information related to a change of a value of at least one information element (IE) among IEs included in the second assistance data.

According to various embodiments, a user equipment (UE) configured to operate in a wireless communication system may be provided.

According to various embodiments, the UE may include a transceiver, and at least one processor coupled to the transceiver.

According to various embodiments, at least one processor may be configured to transmit a first message related to a random access procedure, wherein the first message may include a PRACH preamble, and receive a second message related to the random access procedure in response to the first message.

According to various embodiments, the second message may include first assistance data related to positioning.

According to various embodiments, the PRACH preamble may be included in a plurality of PRACH preambles.

According to various embodiments, the plurality of PRACH preambles may include (i) at least one first PRACH preamble configured for at least one of a contention-based random access procedure or a contention-free random access procedure, and (ii) at least one second PRACH preamble configured for the positioning.

According to various embodiments, the second message may include the first assistance data based on the PRACH preamble being included in the at least one second PRACH preamble.

According to various embodiments, the at least one processor may be further configured to receive a PRS related to the first assistance data, and transmit a third message related to the random access procedure.

According to various embodiments, the third message may include information related to at least one measurement based on the PRS.

According to various embodiments, the third message may be transmitted based on scheduling information for the third message, included in the second message.

According to various embodiments, the at least one processor is further configured to receive, in system information, second assistance data for the positioning.

According to various embodiments, the first assistance data may include information related to a change of a value of at least one information element (IE) among IEs included in the second assistance data.

According to various embodiments, the at least one processor may be further configured to communicate at least one of a mobile terminal, a network, or an autonomous driving vehicle other than a vehicle including the UE.

According to various embodiments, a method performed by an apparatus in a wireless communication system may be provided.

According to various embodiments, the method may include receiving a first message related to a random access procedure, wherein the first message may include a PRACH preamble, and transmitting a second message related to the random access procedure in response to the first message.

According to various embodiments, the second message may include first assistance data related to positioning.

According to various embodiments, a base station (BS) configured to operate in a wireless communication system may be provided.

According to various embodiments, the BS may include a transceiver, and at least one processor coupled to the transceiver.

According to various embodiments, at least one processor may be configured to receive a first message related to a random access procedure, wherein the first message may include a PRACH preamble, and transmit a second message related to the random access procedure in response to the first message.

According to various embodiments, the second message may include first assistance data related to positioning.

According to various embodiments, an apparatus configured to operate in a wireless communication system may be provided.

According to various embodiments, the apparatus may include at least one processor, and at least one memory storing at least one instruction which causes the at least one processor to perform a method.

According to various embodiments, the method may include transmitting a first message related to a random access procedure, wherein the first message may include a physical random access channel (PRACH) preamble, and receiving a second message related to the random access procedure in response to the first message.

According to various embodiments, the second message may include first assistance data related to positioning.

According to various embodiments, a processor-readable medium storing at least one instruction which causes at least one processor to perform a method may be provided.

According to various embodiments, the method may include transmitting a first message related to a random access procedure, wherein the first message may include a physical random access channel (PRACH) preamble, and receiving a second message related to the random access procedure in response to the first message.

According to various embodiments, the second message may include first assistance data related to positioning.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments, a signal may be effectively transmitted and received in a wireless communication system.

According to various embodiments, positioning may be effectively performed in a wireless communication system.

According to various embodiments, positioning may be effectively performed in a wireless communication system.

According to various embodiments, a method of triggering a positioning measurement operation for a radio resource control (RRC)_IDLE/RRC_INACTIVE user equipment (UE) as well as an RRC_CONNECTED UE may be provided.

According to various embodiments, a positioning measurement operation for an RRC_IDLE/RRC_INACTIVE UE as well as an RRC_CONNECTED UE may be provided without ambiguity.

According to various embodiments, signaling overhead may be reduced.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF THE DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 5 is a diagram illustrating a 4-step random access channel (RACH) procedure to which various embodiments are applicable.

FIG. 13 is a diagram illustrating a multi-round trip time (multi-RTT) positioning method to which various embodiments are applicable.

MODE FOR CARRYING OUT THE DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP SYSTEM 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
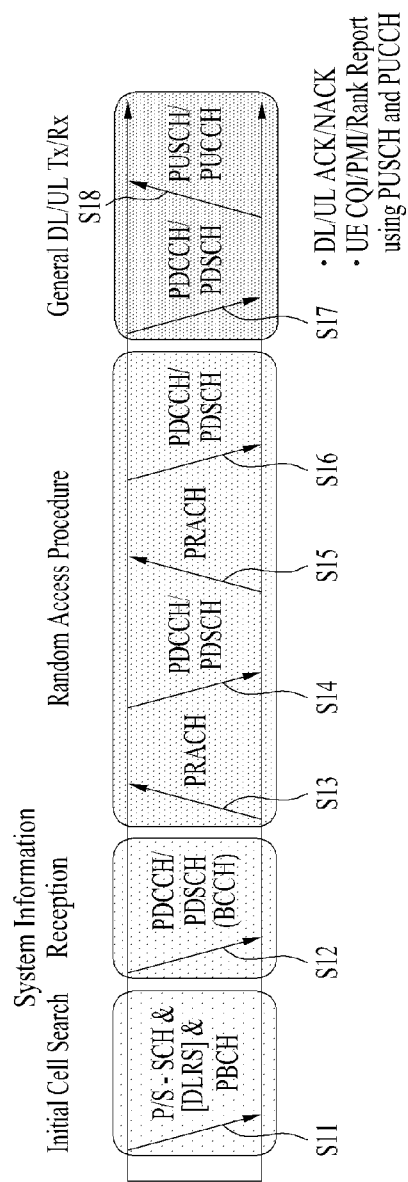
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resources

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 2:
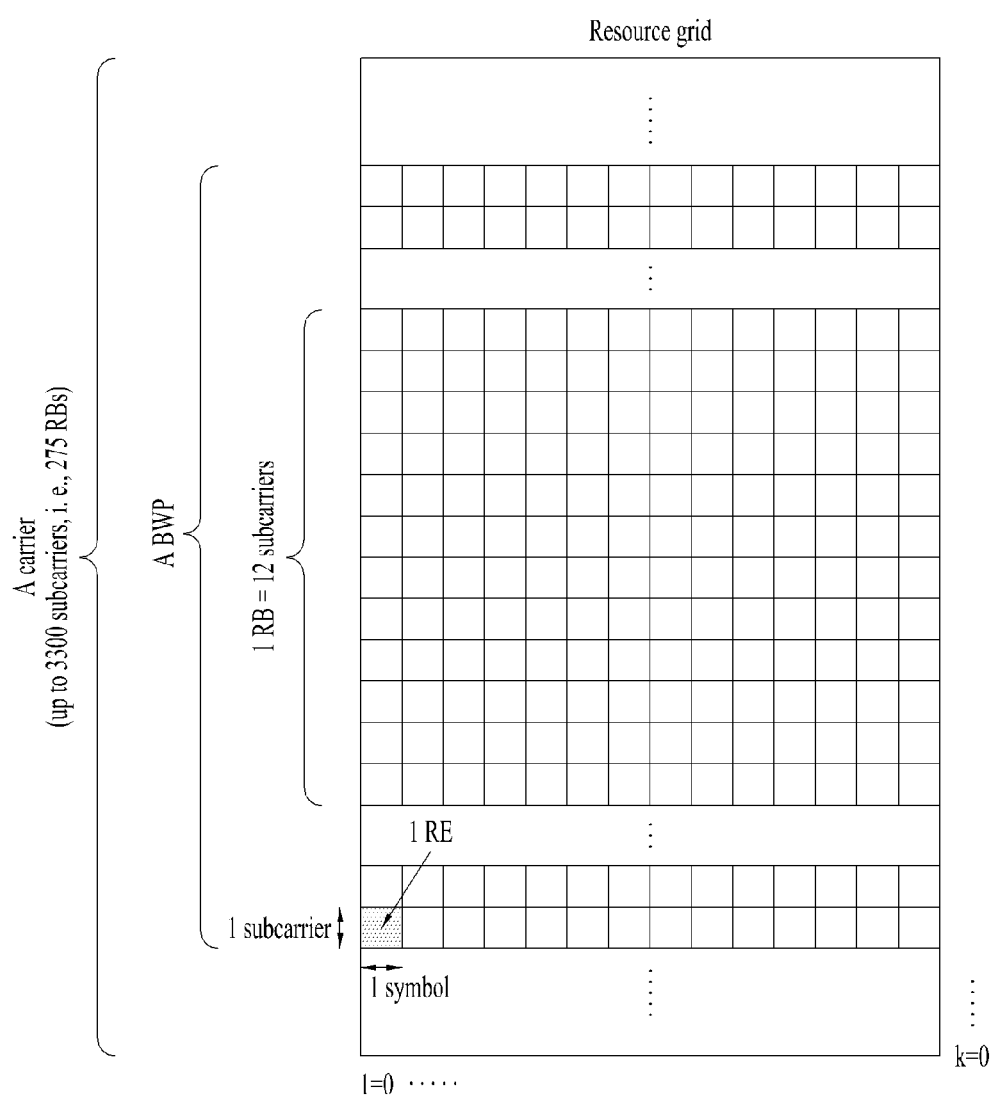
FIG. 2 is a diagram illustrating a resource grid in a new radio (NR) system to which various embodiments are applicable.

FIG. 2 illustrates an exemplary resource grid to which various embodiments are applicable.

Referring to FIG. 2, for each subcarrier spacing (SCS) and carrier, a resource grid is defined as $14 \times 2^\mu$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration $\mu$ and a transmission direction, UL or DL. There is one resource grid for an SCS configuration $\mu$, an antenna port p, and a transmission direction (UL or DL). Each element of the resource grid for the SCS configuration $\mu$ and the antenna port p is referred to as an RE and uniquely identified by an index pair (k, l) where k represents an index in the frequency domain, and l represents a symbol position in the frequency domain relative to a reference point. The RE (k, l) for the SCS configuration $\mu$ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 1 below defines the NR frequency band, by way of example.

TABLE 1

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15$ kHz)*2048) are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology $\mu$, slots are numbered with $n_s^\mu \in \{0, \ldots, N^{slot,\mu}_{subframe}-1\}$ in an increasing order in a subframe, and with $n_{s,f}^\mu \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n_s^\mu$ in a subframe is aligned in time with the start of an OFDM symbol $n_s^\mu * N^\mu_{symb}$ in the same subframe.

Figure 3:
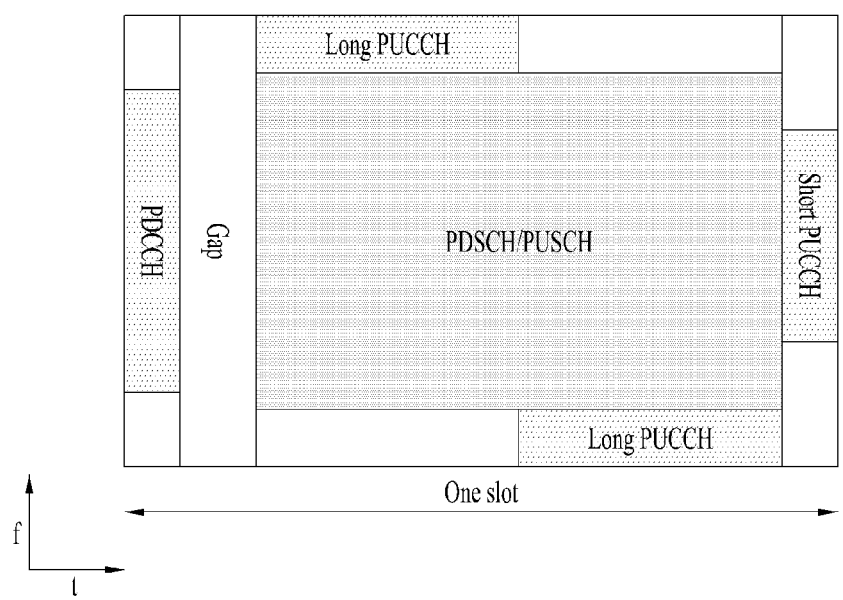
FIG. 3 is a diagram illustrating mapping of physical channels in a slot, to which various embodiments are applicable.

FIG. 3 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. Radio Resource Control (RRC) States

Figure 4:
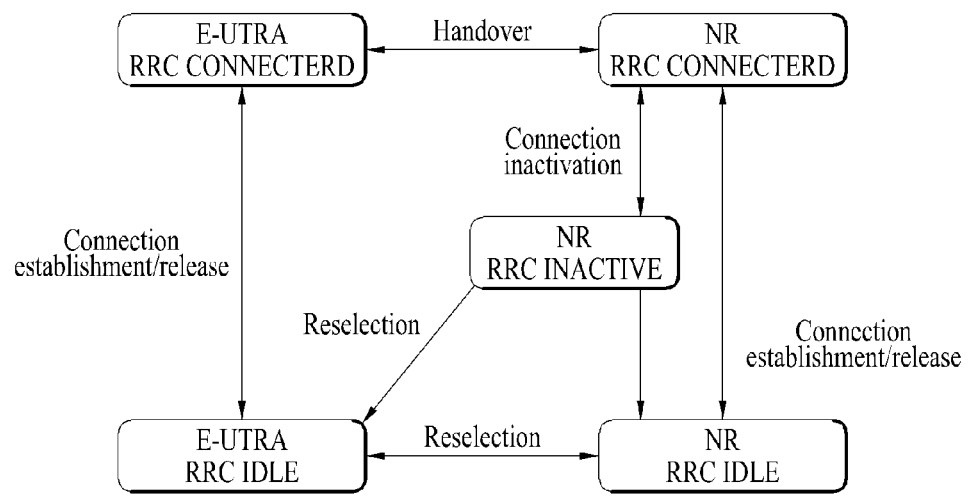
FIG. 4 is a diagram illustrating radio resource control (RRC) states, RRC state transition, and a mobility procedure supported between an NR/next generation core (NGC) and an evolved-universal terrestrial radio access network/evolved packet core (E-UTRAN/EPC), to which various embodiments are applicable.

FIG. 4 is a diagram illustrating RRC states, RRC state transition, and a mobility procedure supported between an NR/next generation core (NGC) and an evolved-universal terrestrial radio access network/evolved packet core (E-UTRAN/EPC), to which various embodiments are applicable.

The UE has only one RRC state at a specific time. The RRC state indicates whether the RRC layer of the UE is logically connected to the layer of the NG radio access network (RAN). When an RRC connection has been established, the UE may be in an RRC_CONNECTED state or an RRC_INACTIVE state. When the RRC connection has not been established, the UE is in an RRC_IDLE state.

In the RRC_CONNECTED state or the RRC_INACTIVE state, the UE has an RRC connection, and accordingly, the NG RAN may recognize the existence of the UE on a cell basis. On the other hand, in the RRC_IDLE state, the UE may not be recognized by the NG RAN and is managed by a core network on a tracking area basis. A tracking area is a unit wider than a cell.

When a user initially turns on the UE, the UE searches for an appropriate cell and maintains the RRC_IDLE state in the cell. Only when the RRC_IDLE-state UE needs to establish an RRC connection, the RRC_IDLE-state UE establishes the RRC connection with the NG RAN in an RRC connection procedure, and transitions to the RRC_CONNECTED state or the RRC_INACTIVE state.

The RRC states of the UE have the following features.

(1) RRC_IDLE State

The UE may be configured with discontinuous reception (DRX) by a higher layer.

The mobility of the UE is controlled based on a network configuration.

The UE monitors a paging channel.

The UE performs neighbor cell measurement and cell (re)selection.

The UE acquires system information.

(2) RRC_INACTIVE State

The UE may be configured with DRX by the higher layer or RRC layer.

The mobility of the UE is controlled based on a network configuration.

The UE stores an access stratum (AS) context.

The UE monitors a paging channel.

The UE performs neighbor cell measurement and cell (re)selection.

When the UE moves outside a RAN-based notification area, the UE performs RAN-based notification area update.

The UE acquires system information.

(3) RRC_CONNECTED State

The UE stores an AS context.

The UE transmits and receives unicast data.

At a lower layer, the UE may be configured with UE-specific DRX.

A UE supporting carrier aggregation (CA) may use one or more secondary cells (SCells) aggregated with a special cell (SpCell), for an increased bandwidth.

A UE supporting dual connectivity (DC) may use a secondary cell group (SCG) aggregated with a master cell group (MCG), for an increased bandwidth.

The UE monitors a paging channel.

When data is scheduled for the UE, the UE monitors a control channel associated with a shared data channel.

The UE provides channel quality and feedback information.

The UE performs neighbor cell measurement and cell (re)selection.

The UE acquires system information.

Particularly, the RRC_IDLE or RRC_INACTIVE UE may operate as described in Table 2 below.

TABLE 2

| | UE procedure |
|---|---|
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

1.4 Random Access (RACH) Procedure

When a UE initially accesses a BS or has no radio resources for signal transmission, the UE may perform a random access procedure with the BS.

The random access procedure is used for various purposes. For example, the random access procedure may be used for initial network access in the RRC_IDLE state, an RRC connection reestablishment procedure, handover, UE-triggered UL data transmission, transition from the RRC_INACTIVE state, time alignment establishment in SCell addition, other system information (OSI) request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (RACH) procedure and a 2-step random access (RACH) procedure.

4-Step RACH: Type-1 Random Access Procedure

FIG. 5 is a diagram illustrating an exemplary 4-step RACH procedure to which various embodiments are applicable.

When the (contention-based) random access procedure is performed in four steps (4-step RACH procedure), the UE may transmit a message (Message 1 or Msg1) including a preamble related to a specific sequence on a physical random access channel (PRACH) (501) and receive a PDCCH and a response message (random access response (RAR) message) (Message 2 or Msg2) for the preamble on a PDSCH corresponding to the PDCCH (503). The UE transmits a message (Message 3 or Msg3) including a PUSCH based on scheduling information included in the RAR (505) and perform a contention resolution procedure involving reception of a PDCCH signal and a PDSCH signal corresponding to the PDCCH signal. The UE may receive a message (Message 4 or Msg4) including contention resolution information for the contention resolution procedure from the BS (507).

The 4-step RACH procedure of the UE may be summarized in Table 3 below.

TABLE 3

| | Type of Signals | Operations/Information obtained |
|---|---|---|
| $1^{st}$ step | PRACH preamble in UL | Initial beam obtainment Random selection of RA-preamble ID |
| $2^{nd}$ Step | Random Access Response on DL-SCH | Timing Advanced information RA-preamble ID Initial UL grant, Temporary C-RNTI |
| $3^{rd}$ Step | UL transmission on UL-SCH | RRC connection request UE identifier |
| $4^{th}$ Step | Contention Resolution on DL | Temporary C-RNTI on PDCCH for initial access C-RNTI on PDCCH for UE in RRC_CONNECTED |

In a random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different cyclic prefixes (CPs) (and/or guard times). An RACH configuration for the initial bandwidth of a primary cell (PCell) is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in RACH resources associated with the selected SSB. For example, when retransmitting the RACH preamble, the UE may reselect one of the SSBs and retransmit the RACH preamble in RACH resources associated with the reselected SSB. That is, the RACH resources for the retransmission of the RACH preamble may be identical to and/or different from the RACH resources for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest transmission power, a power increment, and a power ramping counter.

The RAR information may include the preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may acquire timing advance information based on timing information detected from the PRACH preamble received from the UE and transmit the timing advance information. The UE may transmit a UL signal as Msg3 of the random access procedure on a UL-SCH based on the RAR information. Msg3 may include an RRC connection request and a UE ID. The network may transmit Msg4 in response to Msg3. Msg4 may be handled as a contention resolution message on DL. As the UE receives Msg4, the UE may enter the RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant start from the MSB and ends in the LSB, given as Table 4.

TABLE 4

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 5.

TABLE 5

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

2-Step RACH: Type-2 Random Access Procedure

Figure 6:
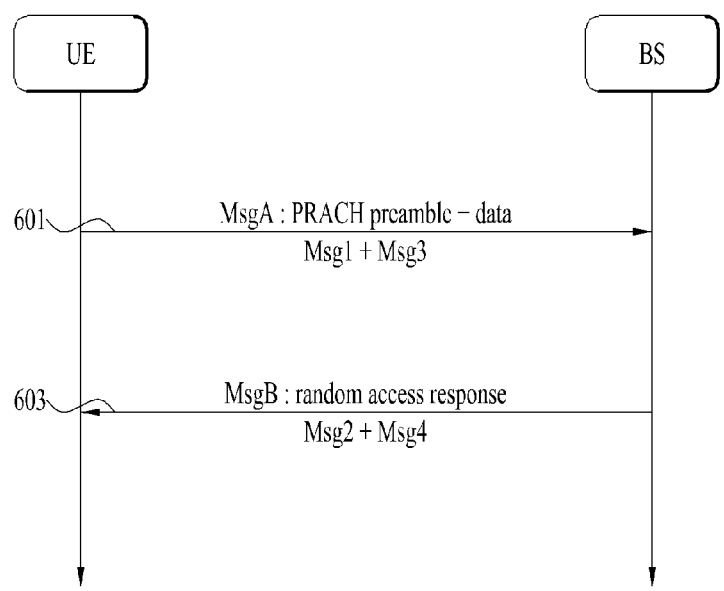
FIG. 6 is a diagram illustrating a 2-step RACH procedure to which various embodiments are applicable.

FIG. 6 is a diagram illustrating an exemplary 2-step RACH procedure to which various embodiments are applicable.

A (contention-based) RACH procedure performed in two steps, that is, a 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (601).

Further, in the 2-step RACH procedure, the BS may combine Msg2 and Msg4 of the 4-step RACH procedure into one message (e.g., MsgB) and transmit the message to the UE (603).

The 2-step RACH procedure may become a low-latency RACH procedure based on the combinations of these messages.

More specifically, MsgA may carry the PRACH preamble included in Msg1 and the data included in Msg3 in the 2-step RACH procedure. In the 2-step RACH procedure, MsgB may carry the RAR included in Msg2 and the contention resolution information included in Msg4.

Contention-Free RACH

Figure 7:
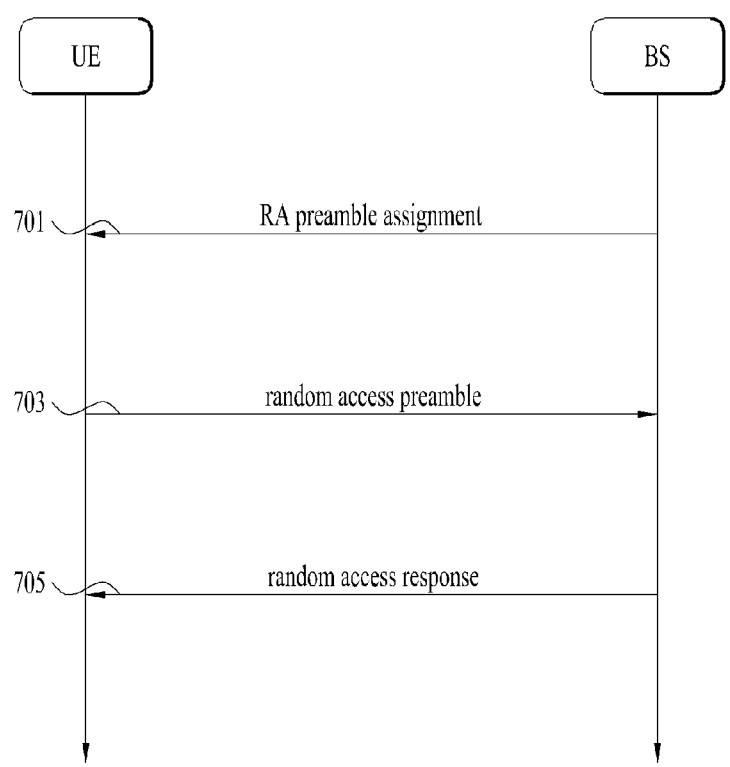
FIG. 7 is a diagram illustrating a contention-free RACH procedure to which various embodiments are applicable.

FIG. 7 is a diagram illustrating an exemplary contention-free RACH procedure to which various embodiments are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (701). Information about the dedicated RACH preamble may be included in an RRC message (e.g., a handover command) or provided to the UE by a PDCCH order. When the RACH procedure starts, the UE transmits the dedicated RACH preamble to the BS (703). When the UE receives an RAR from the BS, the RACH procedure is completed (705).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SystemInformationBlock1 (SIB1).

PRACH Preamble Structure

In the NR system, an RACH signal used for initial access to the BS, that is, for initial access to the BS through a cell used by the BS may be configured using the following elements.

Cyclic prefix (CP): The CP blocks interference from the previous (OFDM) symbol and binds PRACH preamble signals arriving at the BS with different time delays in the same time zone. That is, when a CP is configured to match a maximum cell radius, PRACH preambles transmitted in the same resources by UEs in the cell are inside a PRACH reception window corresponding to a PRACH preamble length configured for PRACH reception by the BS. The length of the CP is generally set equal to or greater than a maximum round trip delay (RTT). The CP may have length TCP.

Preamble (sequence): A sequence is defined for the BS to detect a signal transmission, and a preamble conveys this sequence. The preamble sequence may have length TSEG.

Guard time (GT): The GT is a time period defined to prevent a PRACH signal transmitted from a remotest location of PRACH coverage from the BS and arriving at the BS with a delay from interfering a signal arriving after a PRACH symbol duration. Because the UE does not transmit a signal during this time period, the GT may not be defined as a PRACH signal. The GT may have length TGP.

2. POSITIONING

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1 Positioning Protocol Configuration

Figure 8:
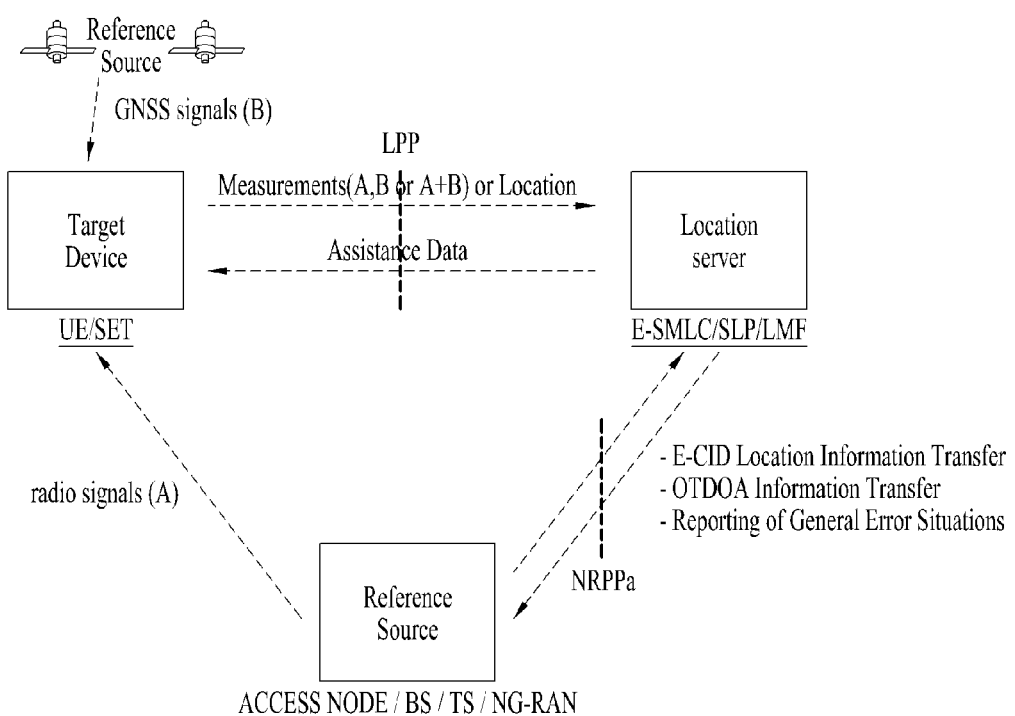
FIG. 8 is a diagram illustrating a positioning protocol configuration for positioning a user equipment (UE), to which various embodiments are applicable.

FIG. 8 is a diagram illustrating an exemplary positioning protocol configuration for positioning a UE, to which various embodiments are applicable.

Referring to FIG. 8, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1-2c(m)) + j\frac{1}{\sqrt{2}}(1-2c(m+1)) \qquad \text{[Equation 1]}$$

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}(N_{symb}^{slot}n_{s,f}^{\mu}+l+1)\right.$$
$$\left.(2(n_{ID,seq}^{PRS} \bmod 1024)+1) + (n_{ID,seq}^{PRS} \bmod 1024)\right) \bmod 2^{31} \qquad \text{[Equation 2]}$$

In Equation 2, $n_{s,f}^{\mu}$ may be a slot number in a frame in an SCS configuration $\mu$. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in DL a PRS Resource

A PRS sequence r(m) may be scaled by $\beta_{PRS}$ and mapped to REs (k, l)$_{p,\mu}$, specifically by Equation 3. (k, l)$_{p,\mu}$ may represent an RE (k, l) for an antenna port p and the SCS configuration $\mu$.

$$a_{k,l}^{(p,\mu)} = \beta_{PRS}r(m)$$

$$m=0,1,\ldots$$

$$k=mK_{comb}^{PRS}+((k_{offset}^{PRS}+k') \bmod K_{comb}^{PRS})$$

$$l=l_{start}^{PRS}, l_{start}^{PRS}+1, \ldots, l_{start}^{PRS}+L_{PRS}-1 \qquad \text{[Equation 3]}$$

Herein, the following conditions may have to be satisfied:

The REs (k, l)$_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$l_{start}^{PRS}$ is the first symbol of the DL PRS in the slot, which may be given by a higher-layer parameter DL-PRS-ResourceSymbolOffset. The time-domain size of the DL PRS resource, $L_{comb}^{PRS} \in \{2,4,6,12\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 6.

TABLE 6

| $K_{comb}^{PRS}$ | \multicolumn{12}{c}{Symbol number within the downlink PRS resource $1-1_{start}^{PRS}$} |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \mod 2^{\mu} T_{per}^{PRS} \in \left\{iT_{gap}^{PRS}\right\}_{i=0}^{T_{rep}^{PRS}-1}$$ [Equation 4]

$N_{slot}^{frame,\mu}$ may be the number of slots per frame in the SCS configuration $\mu$. $n_f$ may be a system frame number (SFN) $n_{s,f}^{\mu}$ may be a slot number in a frame in the SCS configuration $\mu$. A slot offset $T_{offset}^{PRS} \in \{0, 1, \ldots, T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4, 5, 8, 10, 16, 20, 32, 40, 64, 80, 160, 320, 640, 1280, 2560, 5120, 10240\}$ may be given by a higher-layer parameter DL-PRS-Periodicity. A repetition factor $T_{rep}^{PRS} \in \{1, 2, 4, 6, 8, 16, 32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. Operation for UE Positioning

Figure 9:
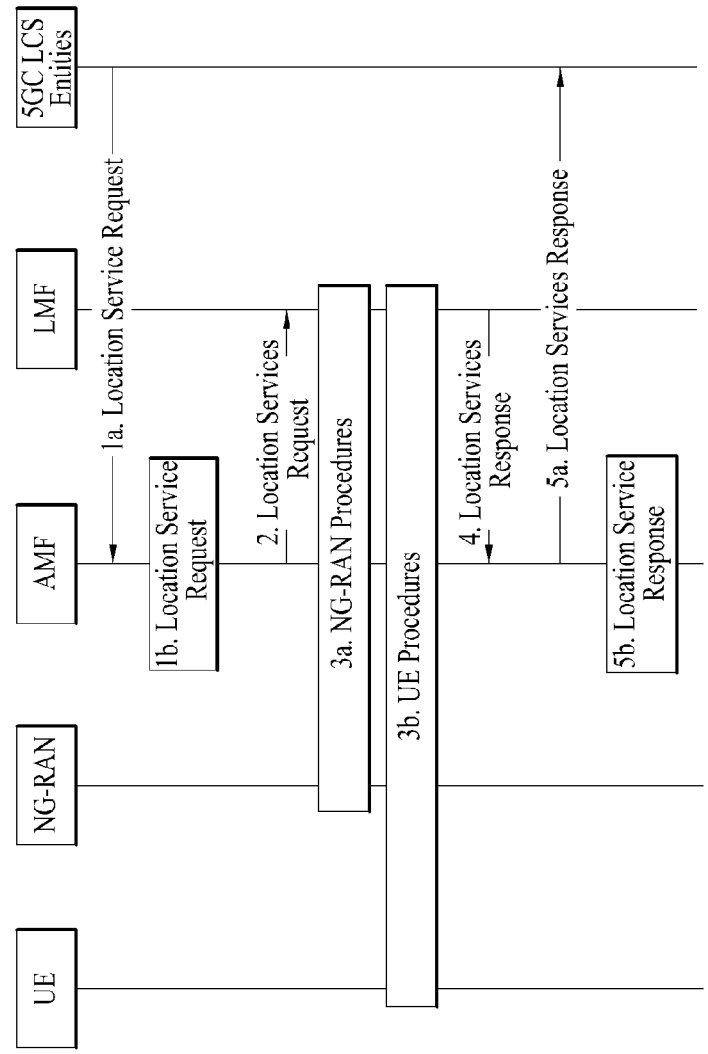
FIG. 9 illustrates an implementation example of a network for UE positioning, which may be used in various embodiments.

FIG. 9 illustrates an implementation example of a network for UE positioning, which may be used in various embodiments.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.4. Protocol for Positioning Measurement

LTE Positioning Protocol (LPP)

Figure 10:
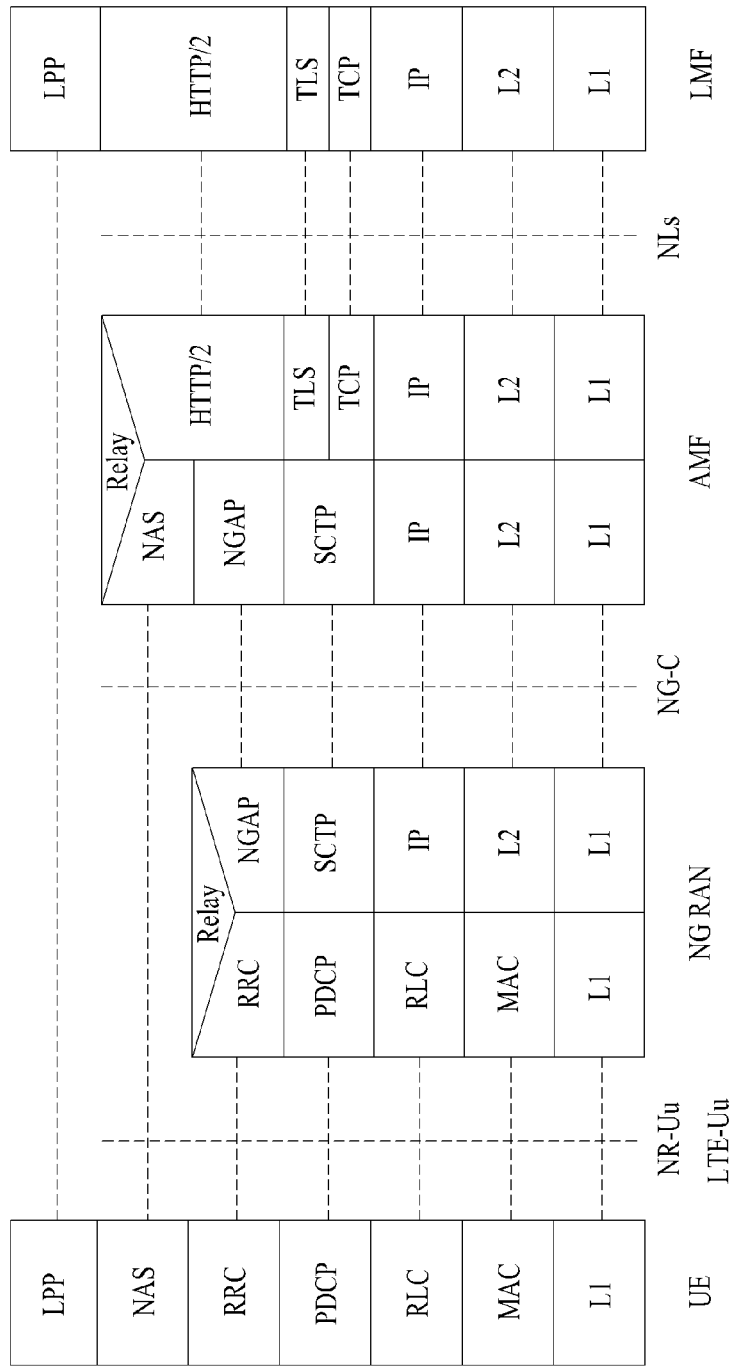
FIG. 10 is a diagram illustrating protocol layers for supporting LTE positioning protocol (LPP) message transmission, to which various embodiments are applicable.

FIG. 10 is a diagram illustrating exemplary protocol layers for supporting LPP message transmission, to which various embodiments are applicable. An LPP PDU may be transmitted in a NAS PDU between an AMF and a UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 11:
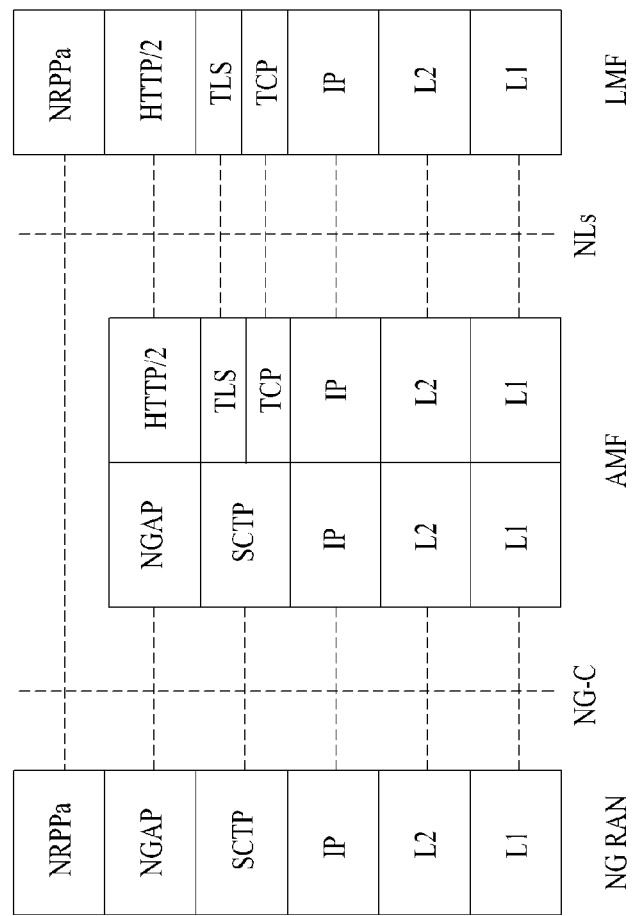
FIG. 11 is a diagram illustrating protocol layers for supporting NR positioning protocol a (NRPPa) protocol data unit (PDU) transmission, to which various embodiments are applicable.

FIG. 11 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.5. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TBS), uplink time difference of arrival (UTDOA) etc. Although any one of the positioning methods may be used for UE positioning, two or more positioning methods may be used for UE positioning.

OTDOA (Observed Time Difference of Arrival)

Figure 12:
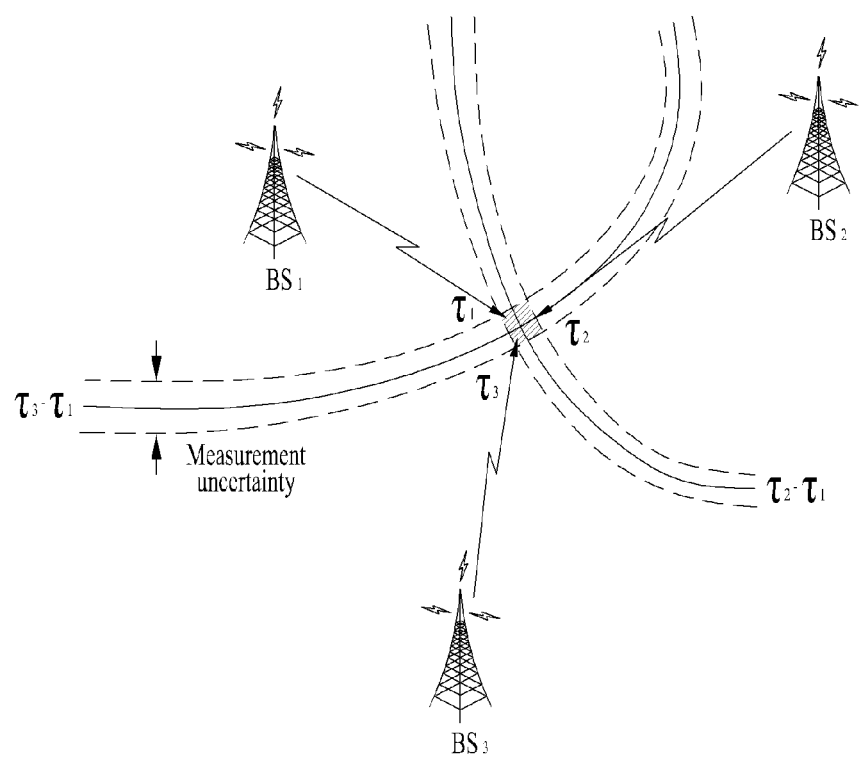
FIG. 12 is a diagram illustrating an observed time difference of arrival (OTDOA) positioning method, to which various embodiments are applicable.

FIG. 12 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi,1 = \sqrt{\frac{(x_t - x_i)^2 + (y_t - y_i)^2}{c}} - \sqrt{\frac{(x_t - x_1)^2 + (y_t - y_1)^2}{c}} + (T_i - T_1) + (n_i - n_1)$$ [Equation 5]

where c is the speed of light, {xt, yt} are (unknown) coordinates of a target UE, {xi, yi} are (known) coordinates of a TP, and {xl, yl} are coordinates of a reference TP (or another TP). Here, (Ti–T1) is a transmission time offset between two TPs, referred to as "real time differences" (RTDs), and ni and n1 are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, TADV may be divided into Type 1 and Type 2 as follows.

TADV Type 1=(ng-eNB RX-TX time difference)+(UE E-UTRA RX-TX time difference)

TADV Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 13 is a diagram illustrating an exemplary multi-round trip time (multi-RTT) positioning method to which various embodiments are applicable.

Referring to FIG. 13(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information about [t2–t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1]$$ [Equation 6]

Referring to FIG. 13(b), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

3. VARIOUS EMBODIMENTS

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C

AoA: angle of arrival

AoD: angle of departure

ECID: enhanced cell identifier

GNSS: global navigation satellite system

LMF: location management function

MO-LR request: mobile originated location request. For example, the UE may send an MO-LR Request included in a UL NAS TRANSPORT message to an access and mobility management function (AMF). For example, the MO-LR request may carry an LPP PDU to instigate one or more LPP procedures to transfer capabilities, request assistance data, request location information and/or transfer location information.

PRACH: physical random access channel
PRS: positioning reference signal
RACH: random access channel
RAR: random access response
RRC: radio access control
RS: reference signal
RSTD: reference signal time difference/relative signal time difference
RTT: round trip time
ToA: time of arrival
TRP: transmission and reception point (TP: transmission point)
posSIB: positioning system information block. This may be a system information block (SIB) containing positioning-related information. For example, the posSIB may include assistance data for positioning. For example, the assistance data may be included in a sub-field (e.g., SIBpos) in the posSIB. For example, the assistance data may include a PRS ID identifying a DL PRS resource. For example, the assistance data may be configured by the server/LMF and transmitted in the posSIB to the UE through the BS.
SIB: system information block Unless otherwise specified, each of N, P, Q, and X represented as the numbers of bits in the description of various embodiments may be a natural number or an integer (equal to or greater than 0).

In the description of various embodiments, a BS may be understood as a generic term covering remote radio head (RRH), eNB, gNB, TP, reception point (RP), relay, and so on.

In the description of various embodiments, greater than/equal to A may be replaced with greater than/equal to A.

In the description of various embodiments, less than/equal to or less than B may be replaced with equal to or less than/less than B.

In the description of various embodiments, a UE-based positioning method may be related to a method of directly calculating/acquiring its own location/positioning information by a UE.

In the description of various embodiments, a UE-assisted positioning method is related to a method in which a UE calculates/acquires a measurement related to its location/positioning (e.g., a value used for UE positioning in the BS/(location)server/LMF, for example, a measurement of at least one of RSTD, AoA, AoD, RTT, or ToA) and reports the measurement, and upon receipt of the report, a network node (e.g., the BS/server/LMF or the like) calculates/acquires the location/positioning information of the UE.

In the UE-assisted positioning method, for example, the measurement result of the UE should be transmitted/reported to the BS or the like, and thus resources for the transmission/reporting may be allocated separately.

In the UE-based positioning method, for example, the UE directly calculates/acquires its location based on the measurement result of the UE, which obviates the need for allocation of separate resources for transmission and reporting. In another example, when the UE needs to transmit/report its location information to the BS/server/LMF (e.g., when the UE is configured to transmit/report the location information to the BS/server/LMF) even in the UE-based positioning method, resources for transmission/reporting of the location information may be allocated separately.

For example, to support DL positioning measurement in the idle/inactive state, one or more of the followings may be considered:

1) In both of the UE-assisted and UE-based methods,
Regardless of the positioning methods (e.g., the UE-assisted and UE-based methods), the UE may perform positioning measurement based on information transmitted in RRC information/system information.
For example, the UE may access only a minimum SIB, and the minimum SIB may not include posSIB in some cases.
For example, when a dedicated PRS configuration is available, resources may be used more efficiently and/or more accurate location estimation may be performed.

2) In the UE-assisted method, the UE may not transmit a measurement report, when resources for the measurement report have not been configured/allocated.

In consideration of the above description, dedicated signaling without transitioning to the RRC_CONNECTED state may be considered according to various embodiments.

According to various embodiments, some procedures (e.g., a paging-related procedure, an RACH-related procedure, and so on) performed before transitioning to the RRC_CONNECTED state may be used. For example, a paging message and/or Msg2 and/or Msg3 and/or MsgA may be used. For example, the 2-step random access procedure and/or the 4-step random access procedure may be used. For example, since the RRC_IDLE/RRC_INACTIVE UE is capable of performing PRS or SSB measurement, the UE may calculate/acquire a timing measurement. For example, a timing measurement from a MsgA PUSCH of the 2-step RACH access procedure may be reported. For example, the BS may transmit a gNB Rx-Tx time difference measurement to the UE in MsgB of the 2-step RACH procedure, and the UE may calculate/acquire an RTT using the gNB Rx-Tx time difference measurement. Additionally, triggering the PRS measurement and/or measurement reporting of the UE by paging may be considered.

Various embodiments may relate to a condition for triggering positioning measurement for a UE. Various embodiments may be applied to both of the UE-assisted and UE-based positioning methods.

The following description is given of various embodiments in the context of PRS measurement-based positioning by way of example, which should not be construed as limiting the various embodiments.

For example, the various embodiments may also be applied to triggering of positioning measurement based on an RS other than a PRS (e.g., SSB/channel state information reference signal (CSI-RS)) and/or triggering of positioning measurement based a method other than use of an RS (e.g., a positioning method based on GNSS/a barometric pressure sensor/WLAN/Bluetooth/TBS/a motion sensor).

A wireless communication system to which various embodiments are applicable (e.g., a wireless communication system supporting Release 16 and/or the standard technology before Release 16) may support UE positioning for an RRC_CONNECTED UE. However, for example, in view of the need for more accurate management of the location/positioning information of an RRC_IDLE/RRC_INACTIVE UE in the BS/server (location server)/LMF and/or the need for directly managing its location/positioning information by the RRC_IDLE/RRC_INACTIVE UE, support of positioning the RRC_IDLE/RRC_INACTIVE UE is under consideration. For example, support of positioning the RRC_IDLE/RRC_INACTIVE UE may be advantageous in terms of time and/or power required for UE state transitioning.

For example, the wireless communication system supporting Release 16 and/or the standard technology before Release 16 may support UE positioning for the RRC_CONNECTED UE. However, for example, in view of the need for more accurate management of the location/positioning information about an RRC_IDLE/RRC_INACTIVE UE in the BS/server (location server)/LMF and/or the need for directly managing its location/positioning information by the RRC_IDLE/RRC_INACTIVE UE, support of positioning the RRC_IDLE/RRC_INACTIVE UE is under consideration. For example, support of positioning the RRC_IDLE/RRC_INACTIVE UE may be advantageous in terms of time and/or power required for UE state transitioning.

For example, because a direct connection between the RRC_IDLE/RRC_INACTIVE UE and the BS/server/LMF is limited (e.g., there is no LPP connection), there may be a need for a positioning mechanism using a pre-agreed/pre-defined/preconfigured rule/mechanism.

Various embodiments may relate to a method of positioning an RRC_IDLE/RRC_INACTIVE UE by using the 4-step random access procedure (type-1 random access procedure or 4-step RACH procedure). According to various embodiments, the UE and/or the BS may exchange information about positioning measurement in a signal and/or data transmitted and received in each step of the 4-step random access procedure and/or may proceed/perform a pre-agreed/predefined procedure based on the information.

According to various embodiments, a method of triggering a positioning procedure using the 4-step random access procedure may be provided.

According to various embodiments, each message in the 4-step random access procedure may include both random access procedure-related information (and/or initial access-related information) (and/or function as a message for the random access procedure) and positioning measurement-related information (and/or function as a message for positioning measurement), and/or may include positioning measurement-related information (and/or function only as a message for positioning measurement).

For example, when the positioning procedure using the 4-step random access procedure is trigged, positioning measurement-related information may be included in each message of the 4-step random access procedure. For example, when the positioning procedure using the 4-step random access procedure is not trigged, random access procedure-related information may be included in the positioning measurement-related information in each message of the 4-step random access procedure. However, various embodiments are not limited thereto. For example, when the positioning procedure using the 4-step random access procedure is not trigged according to a specific need and/or a specific rule, the positioning measurement-related information may be included in one or more of the messages of the 4-step random access procedure.

According to various embodiments, the messages of the 4-step random access procedure used for positioning measurement may be defined as/referred to as Msg1 to Msg4, respectively and/or may be defined as/referred to as other messages. For example, the messages may be generalized as first to fourth messages, respectively.

According to various embodiments, a preamble in Msg1 may enable the BS to acquire UL synchronization and configure/indicate triggering of positioning measurement for a UE at the same time, and/or may configure/indicate triggering of positioning measurement for the UE.

According to various embodiments, Msg2 may include random access procedure-related information (e.g., one or more of information about a preamble sequence detected by the network, timing correction acquired based on a preamble reception timing, scheduling information for Msg3, or a TC-RNTI) and positioning measurement-related information (e.g., assistance data) and/or may include information for positioning measurement (e.g., assistance data).

According to various embodiments, Msg3 may include random access procedure-related information (e.g., at least one of an RRC connection request or a UE ID) and positioning measurement-related information (e.g., a measurement value related to positioning measurement) and/or may include information for positioning measurement (e.g., a measurement value related to positioning measurement).

According to various embodiments, Msg4 may include random access procedure-related information (e.g., contention resolution-related information) and positioning measurement-related information (e.g., assistance data) and/or may include positioning measurement-related information (e.g., assistance data).

Figure 14:
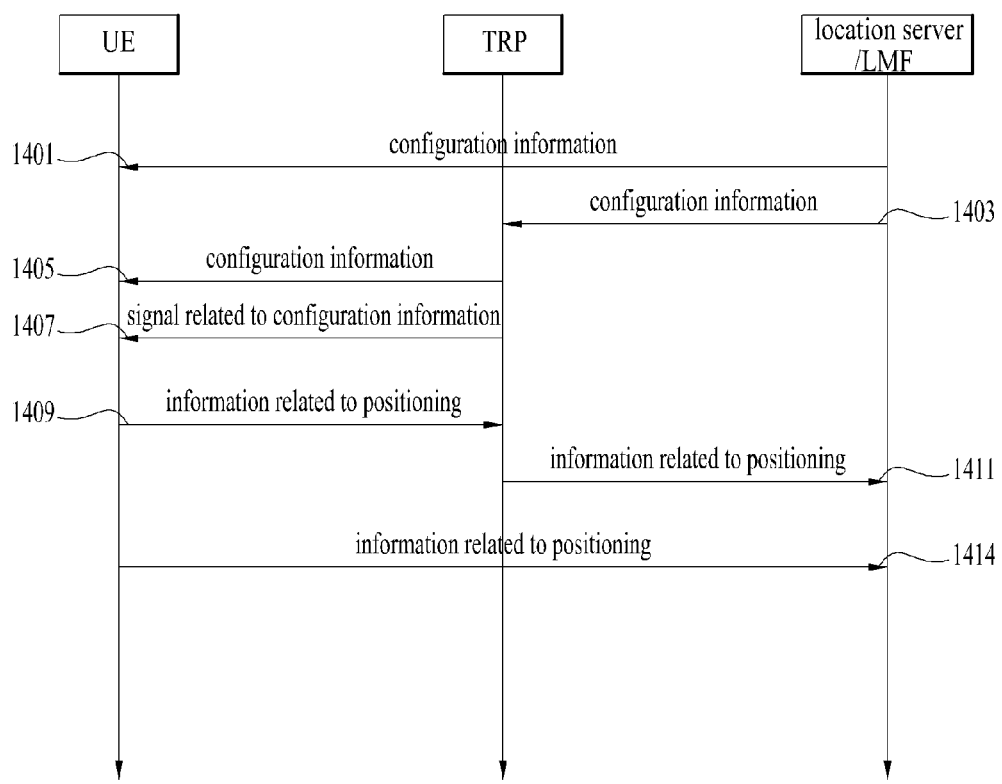
FIG. 14 is a simplified diagram illustrating a method of operating a UE, a transmission and reception point (TRP), a location server, and/or a location management function (LMF) according to various embodiments.

FIG. 14 is a simplified diagram illustrating a method of operating a UE, a TRP, a location server, and/or an LMF according to various embodiments.

Referring to FIG. 14, the location server and/or the LMF may transmit configuration information to the UE, and the UE may receive the configuration information in operation 1401 according to various embodiments.

The location server and/or the LMF may transmit reference configuration information to the TRP, and the TRP may receive the reference configuration information in operation 1403 according to various embodiments. The TRP may transmit the reference configuration information to the UE, and the UE may receive the reference configuration information in operation 1405 according to various embodiments. In this case, operation 1401 according to various embodiments may be skipped.

On the contrary, operations 1403 and 1405 according to various embodiments may be skipped. In this case, operation 1401 according to various embodiments may be performed.

That is, operation 1401 according to various embodiments and operations 1403 and 1405 according to various embodiments may be selectively performed.

In operation 1407 according to various embodiments, the TRP may transmit a signal related to the configuration information to the UE, and the UE may receive the signal related to the configuration information. For example, the signal related to the configuration information may be a signal for positioning the UE.

In operation 1409 according to various embodiments, the UE may transmit a positioning-related signal to the TRP, and the TRP may receive the positioning-related signal. In operation 2011 according to various embodiments, the TRP may transmit the positioning-related signal to the location server and/or the LMF, and the location server and/or the LMF may receive the positioning-related signal.

In operation 1413 according to various embodiments, the UE may transmit the positioning-related signal to the location server and/or the LMF, and the location server and/or the LMF may receive the positioning-related signal. In this case, operations 1409 and 1411 according to various embodiments may be skipped.

On the contrary, operation 1413 may be skipped. In this case, operations 1411 and 1413 according to various embodiments may be performed.

That is, operations 1409 and 1411 according to various embodiments and operation 1413 according to various embodiments may be selectively performed.

According to various embodiments, the positioning-related signal may be acquired based on the configuration information and/or the signal related to the configuration information.

Figure 15:
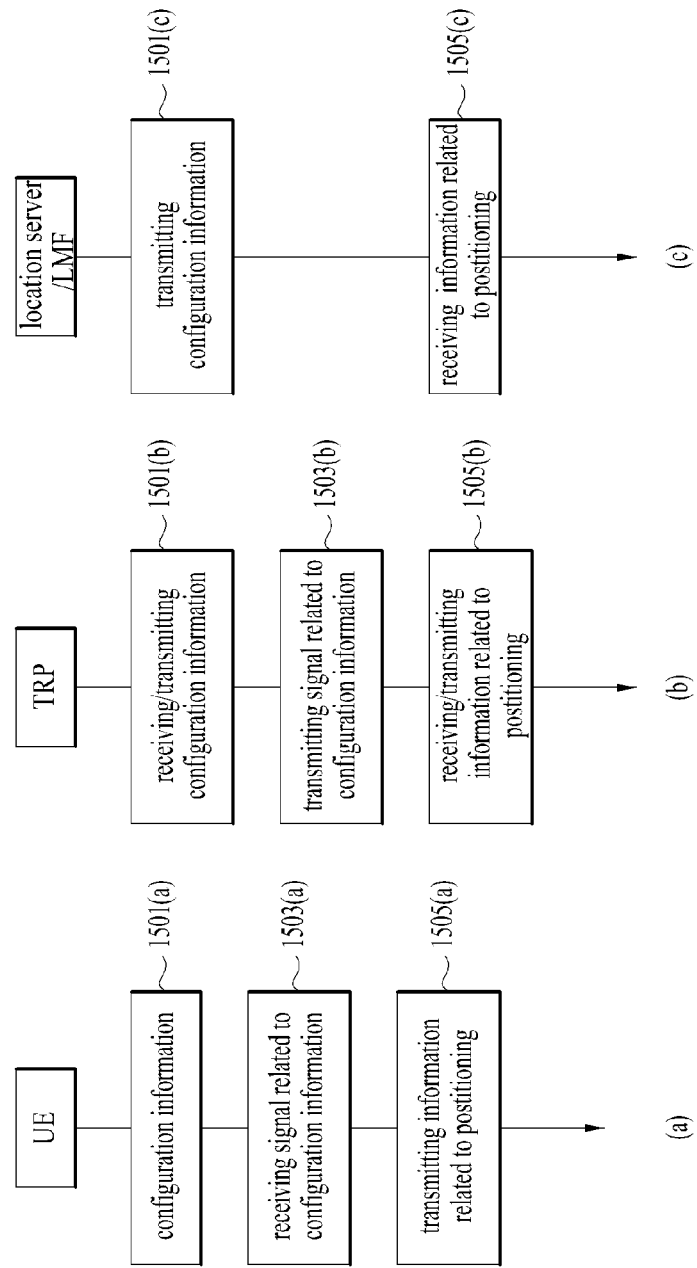
FIG. 15 is a simplified diagram illustrating a method of operating a UE, a TRP, a location server, and/or an LMF according to various embodiments.

FIG. 15 is a simplified diagram illustrating a method of operating a UE, a TRP, a location server, and/or an LMF according to various embodiments.

Referring to FIG. 15(*a*), the UE may receive configuration information in operation 1501(*a*) according to various embodiments.

In operation 1503(*a*) according to various embodiments, the UE may receive a signal related to the configuration information.

In operation 1505(*a*) according to various embodiments, the UE may transmit information related to positioning.

Referring to FIG. 15(*b*), the TRP may receive configuration information from the location server and/or the LMF and transmit the received configuration information to the UE in operation 1501(*b*) according to various embodiments.

In operation 1503(*b*) according to various embodiments, the TRP may transmit a signal related to the configuration information.

In operation 1505(*b*) according to various embodiments, the TRP may receive information related to positioning and transmit the received information related to positioning to the location server and/or the LMF.

Referring to FIG. 15(*c*), the location server and/or the LMF may transmit configuration information in operation 1501(*c*) according to various embodiments.

In operation 1505(*c*) according to various embodiments, the location server and/or the LMF may receive information related to positioning.

For example, the configuration information may be understood as being related to reference configuration (information) and/or one or more pieces of information that the location server and/or the LMF and/or the TRP transmits to/configures for the UE, and/or as being the reference configuration (information) and/or the one or more pieces of information that the location server and/or the LMF and/or the TRP transmits to/configures for the UE, in the following description of various embodiments.

For example, the signal related to positioning may be understood as a signal related to at least one piece of information reported by the UE and/or as a signal including the at least one piece of information reported by the UE, in the following description of various embodiments.

For example, BS, gNB, or cell may be replaced with TRP, TP, or any device playing the same role, in the following description of various embodiments.

For example, location server may be replaced with server, LMF, or any device playing the same role, in the following description of various embodiments.

More specific operations, functions, terms, and so on in operations according to various embodiments may be performed and described based on various embodiments described later. The operations according to various embodiments are exemplary, and one or more of the above-described operations may be omitted according to specific details of each embodiment.

A detailed description will be given below of various embodiments. Unless contradicting each other, the various embodiments described below may be combined fully or partially to form other various embodiments, which may be clearly understood by those skilled in the art.

Various embodiments may relate to a method of using an RACH procedure to support positioning measurement of an RRC_INACTIVE/RRC_IDLE UE.

For example, the positioning measurement procedure may include transmission and reception of location information after requesting for and/or transmission of capability information and/or transmission and reception of assistance data, between the BS/server/LMF and a target (UE). For example, the operation of transmitting location information by the BS/server/LMF may function to request a PRS measurement to the UE and transmit necessary information that the BS/server/LMF intends to acquire from the UE (e.g., request the necessary information to the UE), at the same time. For example, the necessary information may refer to information that the UE should report in relation to positioning. For example, the necessary information may be, but not limited to, one or more of an RSTD, an RTT, information about the ID of a PRS resource used to acquire a measurement value, information about the ID of a PRS resource set used to acquire the measurement value, information about a TP used to acquire the measurement value, information about a time stamp, and information about the quality of the measurement value.

For example, for positioning measurement in the wireless communication system supporting Release 16 and/or the standard technology before Release 16, a one-to-one session connection and/or a multi-to-one session connection may be established serially and/or in parallel between the BS/server/LMF and the target (UE). For example, cell-specific information and/or UE-specific information may all be transmitted and a measurement report (MR) may be acquired from a specific UE, for measurement of an RRC_CONNECTED UE only.

Various embodiments may relate to a method of performing positioning measurement for an RRC_IDLE/RRC_INACTIVE UE using the 4-step random access procedure. According to various embodiments, a session connection between the BS/server/LMF and the target UE may be trigged in two ways: UE-led/initiated and BS/server/LMF-led/initiated.

According to various embodiments, cell-common information related to positioning may be transmitted and received in system information.

Case 1: Positioning Measurement Triggering by UE Side

According to various embodiments, positioning measurement may be triggered by the UE.

According to various embodiments, when the RRC_IDLE/RRC_INACTIVE UE needs to update its location, the methods of Case 1 may be used.

According to various embodiments, when the target UE needs to detect its location accurately under a specific requirement and/or environment, the method of Case 1 may be used even when the target UE is in the RRC_IDLE/RRC_INACTIVE state.

According to various embodiments, the UE may transmit its intention for its own positioning measurement by Msg1 and/or Msg3. According to various embodiments, the server/BS may then transmit a PRS and/or related signaling so that the UE may to perform a related measurement. According to various embodiments, even though the BS receives Msg1 and/or Msg3, the BS may perform a default operation from the perspective of a cell in consideration of impossibility in identifying the specific UE. For example, a default positioning method may be preconfigured/predefined. For example, OTDOA may be configured/defined as the default positioning method. And/or information about a default positioning method may be transmitted in system information.

A. Method 1: Using Msg1

According to various embodiments, Msg1 may be used to trigger positioning measurement. According to various embodiments, a preamble in Msg1 may enable the BS to acquire UL synchronization and configure/indicate triggering of positioning measurement of the UE at the same time, and/or may enable the BS to configure/indicate triggering of positioning measurement of the UE.

According to various embodiments, triggering of positioning measurement using/based on Msg1 may be based on a combination of at least one of Alt.1 and/or Alt.2, and/or based on a combination of at least a part of embodiments described in Alt.1 and/or Alt.2.

Alt. 1: Making Additional Group of Preambles

According to various embodiments, extra preambles may be reserved for positioning measurement.

For example, the total number of preambles for the contention-based and contention-free random access procedures except for preambles used for other purposes such as an SI request may be signaled by system information. For example, in the NR system to which various embodiments are applicable, the number of preambles may be signaled by a cell-specific random access parameter based on an information element (IE), totalNumberOfRA-Preambles. For example, for the definition of totalNumberOfRA-Preambles, see Table 7.

TABLE 7 totalNumberOfRA-Preambles

Total number of preambles used for contention based and contention free 4-step or 2-step randoms access in the RACH resources defined in RACH-ConfigCommon, excluding preambles used for other purposes (e.g. for SI request). If the field is absent all 64 preambles are available for RA. The setting should be consistent with the setting of ssb-perRACH-OccasionAndCB-PreamblesPerSSB, i.e. it should be a multiple of the number of SSBs per RACH occasion.

According to various embodiments, extra preambles may be additionally allocated for positioning measurement. According to various embodiments, preambles for positioning measurement may be configured separately. According to various embodiments, a preamble group including preambles for positioning measurement may be defined/configured. According to various embodiments, a preamble for positioning measurement may be understood as a preamble triggering positioning measurement and/or a positioning procedure.

For example, N preambles may be configured separately from among preambles preserved for other purposes. That is, at least some of the preambles for other purposes may be configured/defined as preambles for positioning measurement (and/or preambles for triggering positioning measurement).

And/or, for example, M preambles may be additionally configured from among preambles reserved for the purpose of the contention-free random access procedure. That is, at least some of the preambles for the purpose of the contention-free random access procedure may be configured/defined as preambles for positioning measurement (and/or preambles for triggering positioning measurement).

And/or, for example, at least some of preambles reserved for the purpose of the contention-based random access procedure may be configured/defined as preambles for positioning measurement (and/or preambles for triggering positioning measurement). In this case, for example, the preambles configured/defined for positioning measurement may be understood as used for both of the contention-based and/or contention-free random access procedure and positioning measurement.

According to various embodiments, when the UE wants positioning measurement, the UE may randomly select a root index (root sequence index) in a preamble group for a corresponding area, and transmit a preamble using the selected root index (root sequence index). As described above, according to various embodiments, preambles for positioning measurement may be defined/configured, and when the UE determines to need positioning measurement, the UE may randomly select one of the preambles for positioning measurement and transmit the selected preamble.

According to various embodiments, upon receipt of a preamble (for positioning measurement), the BS may report detection of the preamble to the server/LMF. According to various embodiments, reporting detection of the preamble may be understood as reporting information about a PRS request and/or transmitting a report including the information about the PRS request. According to various embodiments, upon receipt of the information (the report of detection/the information about the PRS request), the server/LMF may request PRS transmission to a serving cell and/or a related neighbor cell. According to various embodiments, all cells included in assistance data transmitted from a camped-on cell may transmit PRSs according to the corresponding configuration (assistance data).

According to various embodiments, an additional preamble group may be defined to allow the UE to request assistance information (e.g., assistance data). According to various embodiments, preambles for requesting assistance data may be separately configured. According to various embodiments, a preamble group including preambles for requesting assistance data may be defined/configured. According to various embodiments, preambles for positioning measurement and preambles for requesting assistance data may be defined/configured separately and/or understood as identical. When the preambles for positioning measurement and the preambles for requesting assistance data are understood as identical, upon receipt of a preamble for positioning measurement, the BS/server/LMF may transmit assistance data in response to the received preamble according to various embodiments.

For example, at least a part of preambles for other purposes may be configured/defined as preambles for requesting assistance data.

And/or, for example, at least a part of preambles for the contention-free random access procedure may be configured/defined as preambles for requesting assistance data.

And/or, for example, at least a part of preambles for the contention-based random access procedure may be configured/defined as preambles for requesting assistance data. In this case, for example, the preambles configured/defined for requesting assistance data may be understood as being used for both of the contention-based and/or contention-free random access procedure and requesting assistance data.

According to various embodiments, the UE may transmit a preamble of the corresponding preamble group (preamble group including the preambles for requesting assistance data). According to various embodiments, upon detection of the preamble belonging to the preamble group, the BS may transmit assistance data along with Msg2. For example, the assistance data may be included in Msg2.

According to various embodiments, upon receipt of a preamble (for requesting assistance data), the BS may report detection of the preamble to the server/LMF. According to various embodiments, reporting detection of the preamble may be understood as reporting information about an assistance data request and/or transmitting a report including the information about the assistance data request. According to various embodiments, upon receipt of the information (the report of detection/the information about the assistance data request, the server/LMF may configure/generate assistance data and transmit the assistance data to the BS, and the BS may transmit the assistance data to the UE.

Alt. 2: Differentiation of Resources for Preambles

According to various embodiments, positioning measurement may be triggered based on a sequence and/or time/frequency resource/pattern related to Msg1.

For example, Msg1 for positioning measurement may be defined/configured in the code domain. For example, a preamble may be transmitted in the code domain, that is, for example, using an M sequence, a Gold sequence, or a covered Zadoff-Chu (ZC) sequence. For example, a preamble for a (contention-based/contention-free) random access procedure and a preamble for positioning measurement (only for positioning measurement and/or for both of positioning measurement and a random access procedure) may be distinguished from each other in the code domain. For example, a sequence may be defined/configured for each of a preamble for a random access procedure and a preamble for positioning measurement, and the purpose of a preamble may be distinguished/identified according to its sequence.

And/or, for example, Msg1 for positioning measurement may be defined/configured in a time/frequency resource. For example, a time/frequency resource other than an RACH occasion may be utilized to transmit a preamble. For example, a preamble for a (contention-based/contention-free) random access procedure and a preamble for positioning measurement (for positioning measurement only and/or for both of positioning measurement and a random access procedure) may be distinguished by time/frequency resources. For example, an RACH occasion may be defined/configured for each of the preamble for the random access procedure and the preamble for positioning measurement, and the purpose of a preamble may be distinguished/identified according to its RACH occasion.

According to various embodiments, as described above in Alt.1, upon detection of the preamble (for positioning measurement), the BS may transmit information about a PRS request (and/or a report related to the detection) to the server. According to various embodiments, the server may indicate/configure PRS transmission to/for not only a serving cell but also a neighbor cell.

And/or, according to various embodiments, a preamble may be used for the same purpose as an SRS. For example, a preamble may be used for UL channel estimation and/or UL positioning. According to various embodiments, a sequence and/or a time/frequency resource/pattern in which the preamble is transmitted may be shared among neighbor cells and/or all cells (which may include the serving cell) linked to one server/LMF. According to various embodiments, the UE may transmit the preamble by generating a sequence and/or using a resource pattern according to a specific rule associated with a UE-ID and/or a cell ID. According to various embodiments, the BS may perform UL channel estimation based on the detected preamble. And/or, according to various embodiments, the BS may perform UL positioning (e.g., UTDOA) based on the detected preamble.

B. Method 2: Using Msg3

According to various embodiments, Msg3 may be used for positioning measurement.

In Method 1 according to various embodiments, a cell-specifically designated/defined/configured default positioning method may be performed, and the UE may indicate whether the method is initiated/started to the BS/server/LMF by Msg1.

In Method 2 according to various embodiments, the default positioning method may be performed and/or a positioning method different from the default positioning method may be performed. For example, a positioning method preferred by the UE and/or determined to be appropriate by the UE may be performed. In this case, assistance data for the positioning method may be requested, for example, by Msg3. And/or, for example, the BS/server/LMF may configure/indicate a positioning method for/to the UE.

For example, the positioning method may be, but not limited to, at least one of positioning methods/schemes based on OTDOA/ECID/multi-RTT/GNSS/barometric pressure sensor/WLAN/Bluetooth/TBS/motion sensor, and so on.

According to various embodiments, when Msg3 is used, a UE may be temporarily identified by a TC-RNTI transmitted in an RAR. Therefore, when the UE needs assistance data information, the UE may additionally transmit Request Assistance Data-related information in the content of Msg3 (the afore-described information that may be included in Msg3). And/or, according to various embodiments, only the may be included in Msg3. According to various embodiments, when transmitting Msg4 based on Msg3, the BS/server may transmit the Request Assistance Data-related information to the UE.

And/or, according to various embodiments, when the UE has a positioning measurement result on its own before Msg3 transmission, the UE may transmit/report positioning measurement information in Msg3.

The operation of the UE according to various embodiments may be configured/indicated by the BS/location server.

Various embodiments may be used when a faster location-based service is required in the BS/server/LMF.

Case 2: Positioning Measurement Triggering by gNB/Server Side

According to various embodiments, positioning measurement may be triggered by the BS/server/LMF.

For example, since a specific UE is not identified during initial access, it may be difficult to configure/indicate positioning measurement for/to the specific UE and/or to transmit information separately to each UE.

For example, it may occur that assistance data transmitted in system information has been modified/changed (e.g., at least a part of IEs in assistance data transmitted/delivered in the system information has been modified/changed and/or a modification/change/update is requested for at least a part of IEs in the assistance data transmitted/delivered in the system information), and/or the BS needs to cell-commonly request capability information (related to positioning) to a UE attempting random access. For example, when there is a temporary change and/or a faster change (at a rate equal to or larger than a specific threshold) in specific assistance data (e.g., at least a part of the IEs in the assistance data transmitted in the system information) related to the (basic) assistance data transmitted in the system information, transmitting an indication of a system information change using paging at each time may impose overhead on the BS/server/LMF.

According to various embodiments, the BS may transmit the temporarily changed assistance data information by Msg2, for use in positioning measurement of the UE. For example, when there is information requiring replacement/change/update among assistance data transmitted in an SIB, the replaced/changed/updated information may be transmitted in Msg2.

And/or, according to various embodiments, in case location information is required urgently after a random access procedure, information about the capability of the UE may be requested in advance. According to various embodiments, the BS may request capability information by Msg2 to the UE that has transmitted a preamble, and the UE may transmit its capability information in Msg3. According to various embodiments, the BS may quickly support a service by storing/buffering the received information and then applying the capability of the UE identified after contention resolution. And/or, according to various embodiments, the BS/server/LMF may trigger PRS measurement to a specific UE and/or a specific UE group by transmitting Msg2 and/or Msg4.

The operation of the BS according to various embodiments may be requested/configured/indicated by the location server/LMF and/or may be independent of a request of the location server/LMF.

According to various embodiments, when the UE is capable of performing positioning measurement and deriving a measurement result value before transmitting Msg3 (PUSCH), the UE may transmit the measurement result value in Msg3 (PUSCH).

For example, the measurement result value may be an LPP message, Provide Location Information. For example, one or more of cell/BS/TRP information, time stamp information, information about a PRS resource, information about a PRS resource set, a signal strength, an RSTD, a UE Rx-Tx time difference, and a gNB Rx-Tx time difference (and/or a BS/TRP Rx-Tx time difference) may be included in the measurement result value. For example, Provide Location Information reported by the UE may be an RSTD measurement and/or the UE Rx-Tx time difference measurement. According to various embodiments, the BS/location server/LMF may designate/configure/indicate reporting of only specific information by system information (e.g., PosSIB) and/or an LPP message (e.g., Request Location Information) so that the UE may transmit only the specific information out of the corresponding information.

In the case of Msg3 (PUSCH), for example, the number of available bits is limited, which needs to be solved. According to various embodiments, the UE may report the measurement result to the BS/location server/LMF in one or more of the following methods.

A. Scenario #1: A positioning measurement result is transmitted without allocating additional bits to Msg3 (PUSCH).

In the description of Scenario #1 according to various embodiments, no allocation of additional bits to Msg3 (PUSCH) may mean that additional bits are not allocated to the bits allocated to Msg3, for example, in the wireless communication system supporting Release 16 and/or a lower Release. That is, the number of bits allocated to Msg3 in scenario #1 according to various embodiments may be equal to the number of bits allocated to Msg3 in the wireless communication system supporting Release 16 and/or a lower Release, and at least a part of the bits may be used to transmit a positioning measurement result.

Scenario #1 according to various embodiments may be a scenario of transmitting a positioning measurement result in bits allocated to Msg3 (PUSCH). That is, scenario #1 according to various embodiments may be for the case where extra bits are available in the bits allocated to Msg3 (PUSCH).

Method 1: A Positioning Measurement Result is Transmitted in Reserved Bits.

According to various embodiments, a measurement result may be transmitted in unused reserved bits among bits used for transmitting Msg3 (PUSCH). For example, 56 bits and/or 72 bits may be used to transmit Msg3 (PUSCH), and in the presence of reserved bits among the bits, a positioning measurement result may be transmitted in at least a part of the reserved bits.

For example, considering that the remaining information except basic information to be transmitted in Msg3 (PUSCH) should be utilized (e.g., the remaining bits are to be used after the basic information to be transmitted in Msg3 (PUSCH) is mapped), the number of the remaining bits may be relatively small.

According to various embodiments, the UE may transmit only essential information and/or configure/define the value of the essential information as a quantized value, in consideration of the relatively small number of the remaining bits.

For example, the essential information may be information about an RSTD.

For example, when an RRC_CONNECTED UE reports the corresponding value (e.g., RSTD) in P bits in a measurement report and/or when the result value (e.g., RSTD) has been reported in P bits, N bits are available (for a positioning measurement result) in Msg3 (PUSCH), and N<P, a relatively low resolution may be applied to measurement reporting of the UE. For example, a lower resolution than a resolution applied to measurement reporting of the RRC_CONNECTED UE may be applied in this case. For example, a higher resolution than the resolution applied to measurement reporting of the RRC_CONNECTED UE may be applied. For example, if the resolution applied to measurement reporting of the RRC_CONNECTED UE is A Tc (and/or A Ts) and the resolution applied to measurement reporting of the RRC_IDLE/RRC_INACTIVE UE is B Tc (and/or B Ts), A<B. More details will be described below.

According to various embodiments, essential information to be transmitted by the UE and/or a quantized value of the essential information to be transmitted in Msg3 (PUSCH) may be predefined and/or configured/indicated in system information and/or an LPP message by the BS/location server/LMF.

For example, the essential information to be transmitted by the UE may be predefined and/or configured/indicated.

For example, the quantized value used to transmit and receive the essential information may be predefined and/or configured/indicated.

B. Scenario #2: A positioning measurement result is transmitted based on allocation of additional bits to Msg3 (PUSCH).

In the description of scenario #2 according to various embodiments, allocation of additional bits to Msg3 (PUSCH) may mean that bits are added to the bits allocated to Msg3, for example, in the wireless communication system supporting Release 16 and/or a lower Release. That is, the number of bits allocated to Msg3 in scenario #2 according to various embodiments may be larger than the number of bits allocated to Msg3 in the wireless communication system supporting Release 16 and/or a lower Release, and at least a part of the bits may be used to transmit a positioning measurement result.

Scenario #2 according to various embodiments may be a scenario of adding bits to the bits allocated to Msg3 (PUSCH) to transmit a positioning measurement result to the BS/server/LMF.

According to various embodiments, two methods are available for allocation of additional bits: (Method 1) only when a random access procedure is performed for positioning measurement, additional bits are allocated to Msg3 (PUSCH); and (Method 2) bits to be used for positioning measurement is always included as basic transmission information of Msg3 (PUSCH).

Method 1: Additional bits are configured for positioning measurement.

According to various embodiments, when a random access procedure is used for positioning measurement as described before, additional bits may be allocated to Msg3 (PUSCH).

According to various embodiments, if 56 bits and/or 72 bits for initial access are used in an RACH procedure, for example, for beam failure recovery, a system information request, or handover, 56 or 72 bits+N bits (N>0) may be used for the UE to transmit a measurement result in Msg3 (PUSCH) in consideration of an RACH procedure for positioning, according to Method 1. For example, the measurement result may be mapped to the added N bits and/or to the 56 or 72 bits+N bits.

And/or, according to various embodiments, preambles may be grouped separately according to their purposes. For example, preambles for positioning measurement (and/or preambles for positioning measurement and initial access) and preambles for initial access may be distinguished. For more details, refer to Alt.1 of Case 1 according to various embodiments.

And/or, according to various embodiments, when Msg3 (PUSCH) may deliver UE capability information and/or positioning measurement information and/or an MO-LR request (and/or data/information for other purposes), bits may be defined for use according to each purpose and/or may be associated with preambles, as described before.

For example, the size of payload (and/or the number of bits in payload) to be reported may be different according to each purpose and/or data corresponding to each purpose may be defined/configured according to the purpose and/or a preamble group corresponding to/mapped to each purpose may be predefined/preconfigured. For example, the purposes may be, but not limited to, MO-LR request information, transfer capability, request assistance data, request location information, and transfer location information.

And/or, according to various embodiments, only minimum information (e.g., a UE ID) for identifying a UE may be included in Msg3 (PUSCH), whereas only a measurement result is included in the remaining part (e.g., the remaining bits except for bits to which the UE ID is mapped).

And/or, according to various embodiments, a specific RACH preamble/sequence may be allocated so that the UE may request positioning measurement (e.g., the positioning measurement request may include a request for a PRS/SRS configuration) by the RACH preamble/sequence and/or may use the RACH preamble/sequence in selecting/determining PUSCH bits for transmitting a positioning measurement report in Msg3 (PUSCH).

According to various embodiments, requesting a PosSIB by transmitting a specific PRACH preamble by the UE may be interpreted as requesting a PRS resource configuration which has not been configured yet, by the UE. Additionally, according to various embodiments, an operation of requesting transmission of a PRS which has been configured but has not been transmitted, by transmitting the specific PRACH preamble by the UE may be provided.

For example, it may occur that a PRS resource has been configured but the BS has not transmitted a PRS yet. For example, it may be assumed that although a PRS resource has been configured, the BS/location server/LMF has turned "OFF" PRS transmission due to network overhead/interference or the like. According to various embodiments, in this case, the UE may request PRS transmission (and/or "ON" of PRS transmission) by transmitting a PRACH preamble. For example, an independent/dedicated PRACH preamble may be configured/indicated separately for this UE operation.

Method 2: Extra Bits are Configured for a Measurement Report in Addition to the Bits of Msg3 (PUSCH)

In Method 2 according to various embodiments, unlike Method 1 described above, Msg3 (PUSCH) of X+N bits may be redefined by adding N bits to X bits allocated to Msg3 (PUSCH). For example, 56 or 72 bits+X bits may be defined as the bits of Msg3 (PUSCH).

According to various embodiments, since Msg3 has been redefined, bits to be used (available) for positioning measurement may always be included as basic transmission information of Msg3 (PUSCH). According to various embodiments, this may be understood not as additionally defining bits for a specific purpose, but as redefining Msg3 (PUSCH) by increasing the number of bits of information transmittable in Msg3 (PUSCH).

In Method 2 according to various embodiments, since all UEs should use the corresponding bits regardless of whether or not positioning measurement is performed, the limitation on the number of available bits may be strict, compared to Method 1.

According to various embodiments, the UE may transmit only essential information and/or configure/defined the value of the essential information as a quantized value. For example, for a resolution related to quantization, refer to Method 1.

For example, specific information corresponding to the essential information may be information about an RSTD.

For example, when the UE in the RRC_CONNECTED state reports the corresponding value (e.g., specific information such as an RSTD) in Q bits in a measurement report and/or when a result value (e.g., an RSTD) has been reported in Q bits, if the corresponding result value is transmitted in Msg3 (PUSCH), the result value may be additionally transmitted in N bits fewer than Q bits in Msg3 (PUSCH).

And/or, according to various embodiments, the specific information may be variably indicated/configured by the BS/server/LMF in system information and/or an LPP message. According to various embodiments, the UE may deliver result values corresponding to the indicated information in the order of the indicated information. According to various embodiments, the BS may interpret the received information in order, thereby reducing the number of bits required for identification of information from the UE. In other words, according to various embodiments, since result values corresponding to information are delivered in an indicated order, what value each result value (and/or information corresponding to each result value) is (and/or what information each result value corresponds to) does not need to be indicated by a separate identifier or the like, and thus the number of reported bits may be reduced.

Apart from the above-described scenarios according to various embodiments, the following may be commonly used.

According to various embodiments, an RSTD and a UE Rx-Tx time difference may be reported not with a legacy high resolution (e.g., for the RRC_CONNECTED state) but with a low resolution and thus in fewer bits than the legacy ones. This operation may be intended, for example, to solve a problem that may occur when there are more data to be transmitted than the limited number of bits of Msg3 (PUSCH).

According to various embodiments, a high resolution quantization table, which is a reporting table for legacy timings (and/or positioning measurements), and an additional reporting table may be created.

According to various embodiments, it may be defined that the additional reporting table is used only when a timing measurement is reported on an Msg3 PUSCH. According to various embodiments, the additional reporting table may be a low resolution quantization table.

An example of the reporting table will be described. While a reporting table for RSTD reporting is described, a reporting table for reporting other positioning-related measurement values, such as a report of a UE Rx-Tx time difference measurement, may be separately defined/configured for each measurement value.

For example, in regard to the high resolution quantization table described above, a report range for DL RSTD measurements may be defined to be from $-985024 \times T_c$ to $985024 \times T_c$ with a resolution step of $2k \times T_c$.

For example, $kmin \leq k \leq kmax$.

For example, the values of kmin and kmax may vary depending on whether one or more PRS resources of a reference cell or all neighbor cells which have been measured for RSTD measurement are included in FR2, or one or more PRS resources of the reference cell or one or more of the neighbor cells are included in FR1. k may have to be equal to or greater than a value set by timingReportingGranularityFactor.

For example, a reporting table specifying measurement report mapping may be defined/configured according to each k value.

For example, an example of the reporting table may be defined as Table 8. For example, Table 8, which is for report mapping for an RSTD measurement report for k=0, may be an example of the high resolution quantization table described above.

TABLE 8

| Reported Quantity Value, RSTD_i | Measured Quantity Value, RSTD | Unit |
|---|---|---|
| RSTD_0000000 | RSTD < −985024 | $T_c$ |
| RSTD_0000001 | −985024 ≤ RSTD < −985023 | $T_c$ |
| RSTD_0000002 | −985023 ≤ RSTD < −985022 | $T_c$ |
| . . . | . . . | . . . |
| RSTD_0985024 | −1 ≤ RSTD < 0 | $T_c$ |
| RSTD_0985025 | 0 ≤ RSTD < 1 | $T_c$ |
| . . . | . . . | . . . |
| RSTD_1970047 | 985022 ≤ RSTD < 985023 | $T_c$ |
| RSTD_1970048 | 985023 ≤ RSTD < 985024 | $T_c$ |
| RSTD_1970049 | 985024 ≤ RSTD | $T_c$ |

For example, referring to Table 8, the measured quantity values may be classified according to preset ranges, and different reported quantity values may be assigned to/correspond to the respective ranges. For example, a measured quantity value may be quantized accordingly, and a corresponding resolution may be $T_c$ (k=0).

According to various embodiments, a low resolution quantization table may be defined/configured in addition to the above reporting table. For example, the measured quantity values described above may be classified according to the preset ranges, and different indexes (e.g., reported quantity values) may be assigned/correspond to the ranges. For example, a measured quantity value may be quantized accordingly, and a corresponding resolution may be greater than $T_c$ (k=0).

According to various embodiments, the BS/location server/LMF may limit a measurement report of the UE to a specific cell/BS/TRP as described before. This operation may be intended, for example, to solve the above-described problem (e.g., a problem related to the limit bits of Msg3 (PUSCH)).

For example, when reporting RSTDs for specific physical cells/BSs/TRPs #1, #2, and #3 to the BS/location server/LMF is configured for/indicated to the UE, the UE may report RSTD measurement information according to a specific rule, without including information about the physical cells/BSs/TRPs. According to various embodiments, the UE may identify a physical cell/BS/TRP which each measurement is for from the specific rule.

According to various embodiments, the specific rule may be related to indicating and/or identifying that a measurement report corresponding to a location service (LCS) is for a cell/TRP/BS other than an originally configured/indicated cell/TRP/BS. For example, the UE may also measure a cell/TRP/BS which has not been directly configured/indicated by the BS/server/LMF and report the measurement result (in a certain case). In this case, for example, although the measurement report of the UE may include a physical cell ID and/or a global cell ID, it may not be clear whether the value is for the original cell/TRP/BS intended by the BS/server/LMF. To eliminate the ambiguity, for example, the measurement report of the UE may include an indication/identifier indicating whether the measurement result is for a cell/TRP/BS originally intended by the BS/server/LMF (and/or directly configured/indicated by the BS/server/LMF) or for another cell/TRP/BS determined by the UE. For example, the network may distinguish/identify the cell/TRP/BS based on the indication/identifier and use this for UE positioning. In another example, a measurement report corresponding to each TRP may be reported/transmitted at a different resource position. For example, a resource position to which a measurement value for each TRP is mapped may be predetermined for the TRP, and a TRP corresponding to each measurement value may be identified/distinguished by a corresponding resource position.

And/or, according to various embodiments, the UE may report/transmit top M (>0) good measurement result values in limited bits based on the results of measurements performed autonomously by the UE. For example, the top M (>0) measurements may be determined from the measurement quality of each measurement result value. For example, the top M measurements may correspond to top M measurement quality values in a descending order or in an ascending order.

Figure 16:
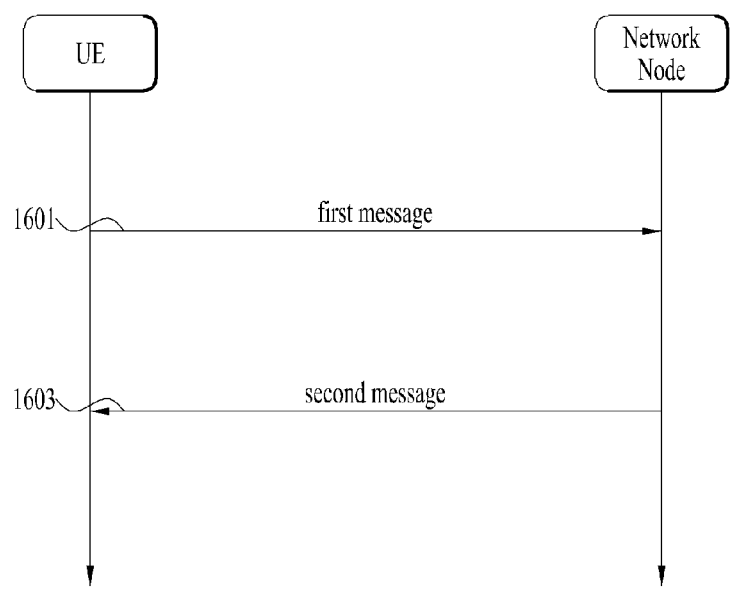
FIG. 16 is a simplified diagram illustrating a method of operating a UE and a network node according to various embodiments.

FIG. 16 is a simplified diagram illustrating a method of operating a UE and network nodes according to various embodiments.

Figure 17:
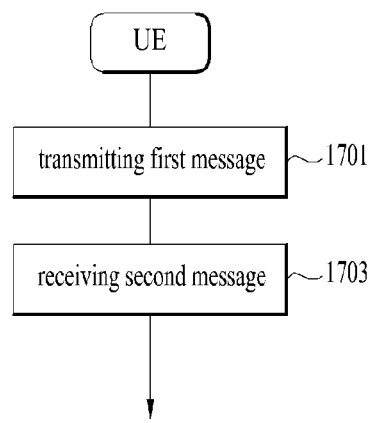
FIG. 17 is a flowchart illustrating a method of operating a UE according to various embodiments.

FIG. 17 is a flowchart illustrating a method of operating a UE according to various embodiments.

Figure 18:
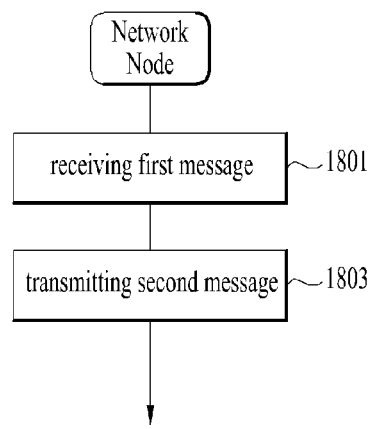
FIG. 18 is a flowchart illustrating a method of operating a network node according to various embodiments.

FIG. 18 is a flowchart illustrating a method of operating a network node according to various embodiments. For example, the network node may be a TP and/or a BS and/or a cell and/or a location server and/or an LMF and/or any device performing the same operation.

Referring to FIGS. 16, 17 and 18, the UE may transmit a first message related to a random access procedure, and the network node may receive the first message in operations 1601, 1701, and 1801 according to various embodiments.

According to various embodiments, the first message may include a PRACH preamble.

The network node may transmit a second message related to the random access procedure in response to the first message, and the UE may receive the second message, in operations 1603, 1703, and 1803 according to various embodiments.

According to various embodiments, the second message may include assistance data related to positioning.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. EXEMPLARY CONFIGURATIONS OF DEVICES IMPLEMENTING VARIOUS EMBODIMENTS 4.1. Exemplary Configurations of Devices to which Various Embodiments are Applied FIG. 19 is a diagram illustrating a device that implements various embodiments.

Figure 19:
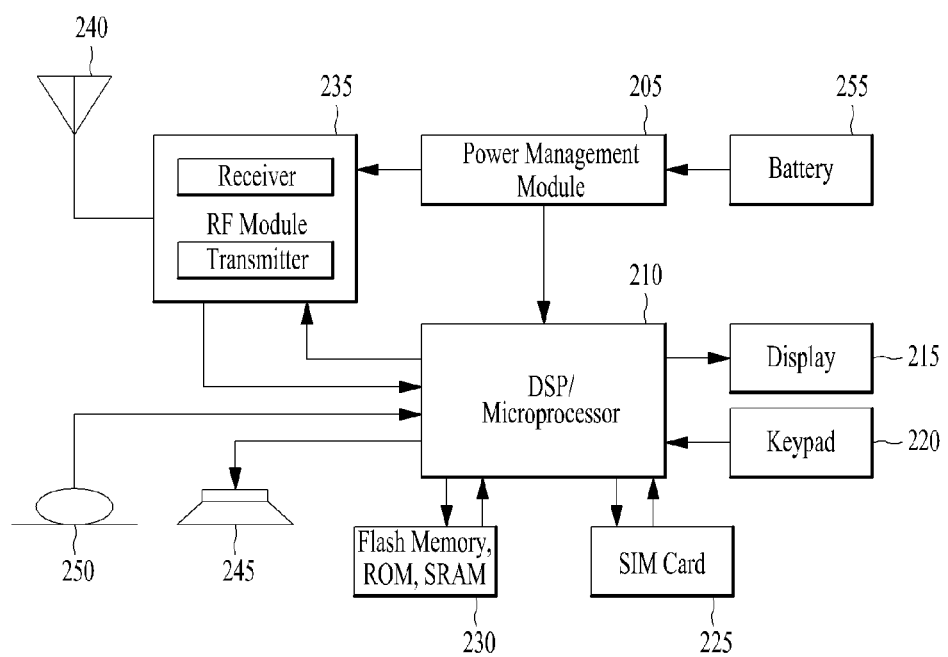
FIG. 19 is a diagram illustrating a device for implementing various embodiments.

The device illustrated in FIG. 19 may be a UE and/or a BS (e.g., eNB or gNB or TP) and/or a location server (or LMF) which is adapted to perform the above-described mechanism, or any device performing the same operation.

Referring to FIG. 19, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 19 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 19 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or the at least one processor of the communication device included in the UE) may transmit a first message related to a random access procedure.

According to various embodiments, the first message may include a PRACH preamble.

According to various embodiments, the at least one processor included in the UE may receive a second message related to the random access procedure in response to the first message.

According to various embodiments, the second message may include assistance data related to positioning.

According to various embodiments, the at least one processor included in the network node (or the at least one processor of the communication device included in the network node) may receive a first message related to a random access procedure.

According to various embodiments, the first message may include a PRACH preamble.

According to various embodiments, the at least one processor included in the network node may transmit a second message related to the random access procedure in response to the first message.

According to various embodiments, the second message may include assistance data related to positioning.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied

Various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
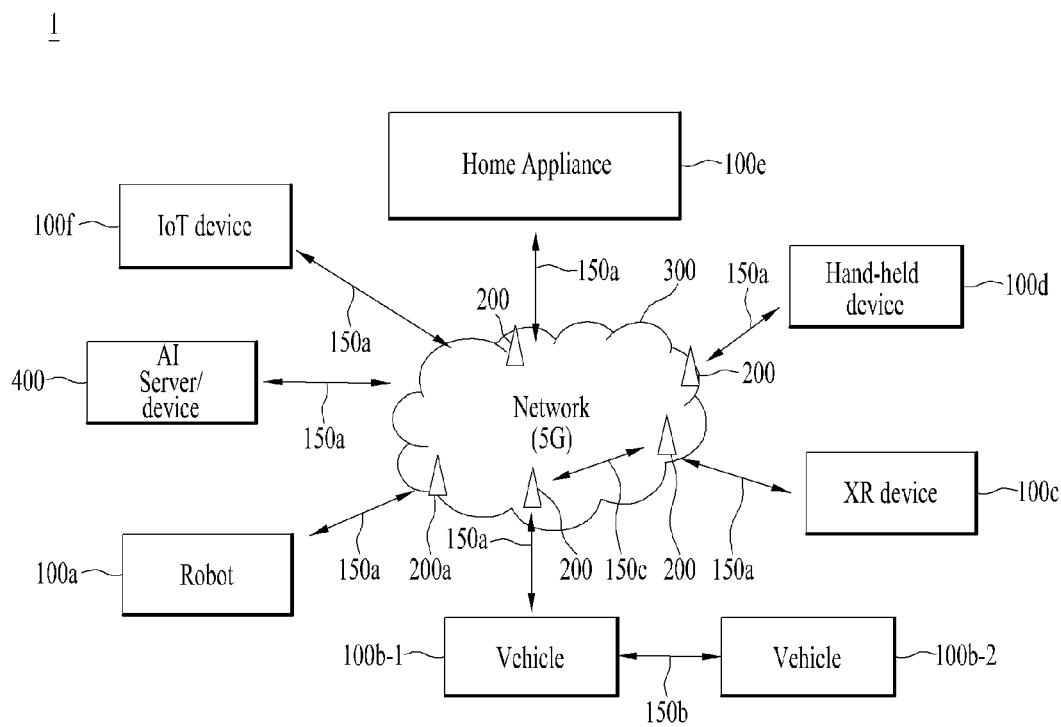
FIG. 20 is a diagram illustrating a communication system applied to various embodiments.

FIG. 20 illustrates an exemplary communication system to which various embodiments are applied.

Referring to FIG. 20, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 21:
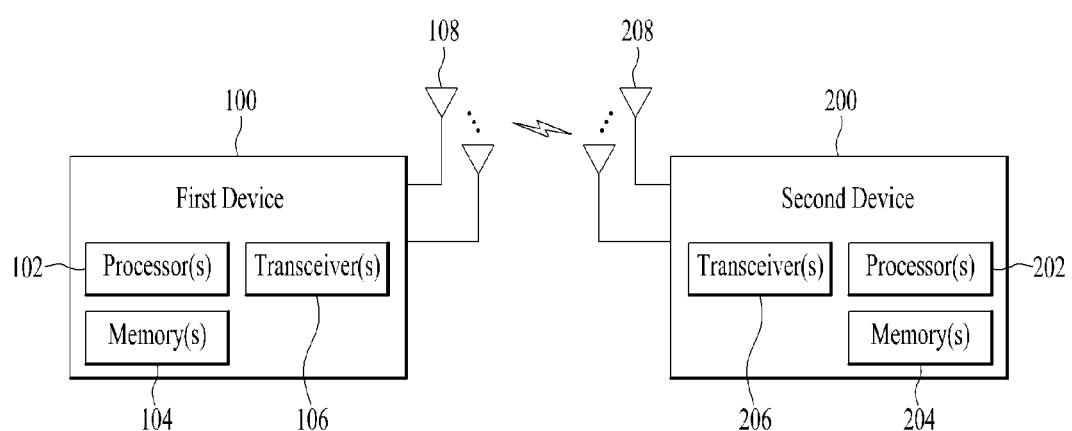
FIG. 21 is a diagram illustrating an example of wireless devices applied to various embodiments.

FIG. 21 illustrates exemplary wireless devices to which various embodiments are applicable.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the present disclosure.

According to various embodiments, a computer-readable storage medium may store one or more instructions or computer programs which, when executed by one or more processors, cause the one or more processors to perform operations according to various embodiments or implementations of the present disclosure.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Example of Using Wireless Devices to which Various Embodiments are Applied

Figure 22:
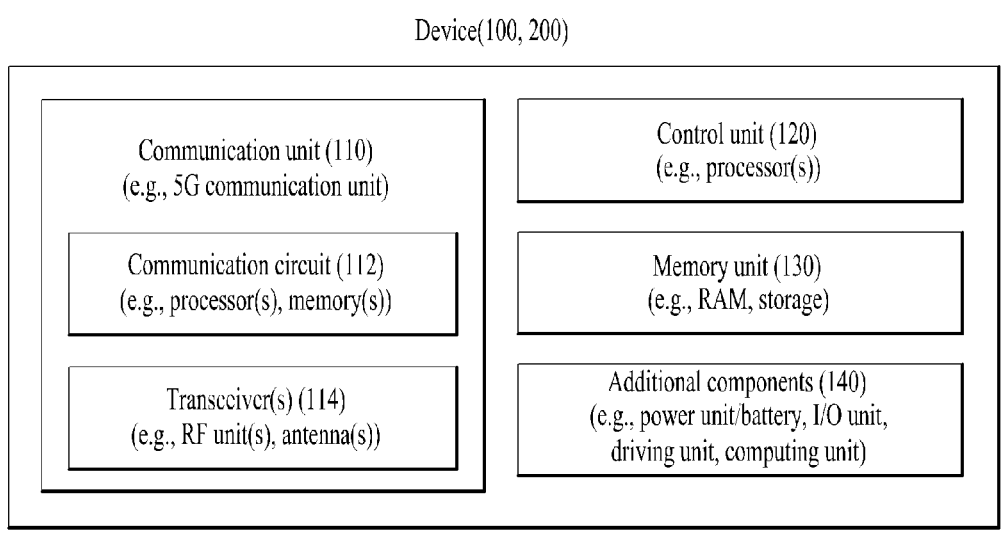
FIG. 22 is a diagram illustrating another example of wireless devices applied to various embodiments.

FIG. 22 illustrates other exemplary wireless devices to which various embodiments are applied. The wireless devices may be implemented in various forms according to a use case/service (see FIG. 20).

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Example of Portable Device to which Various Embodiments are Applied

Figure 23:
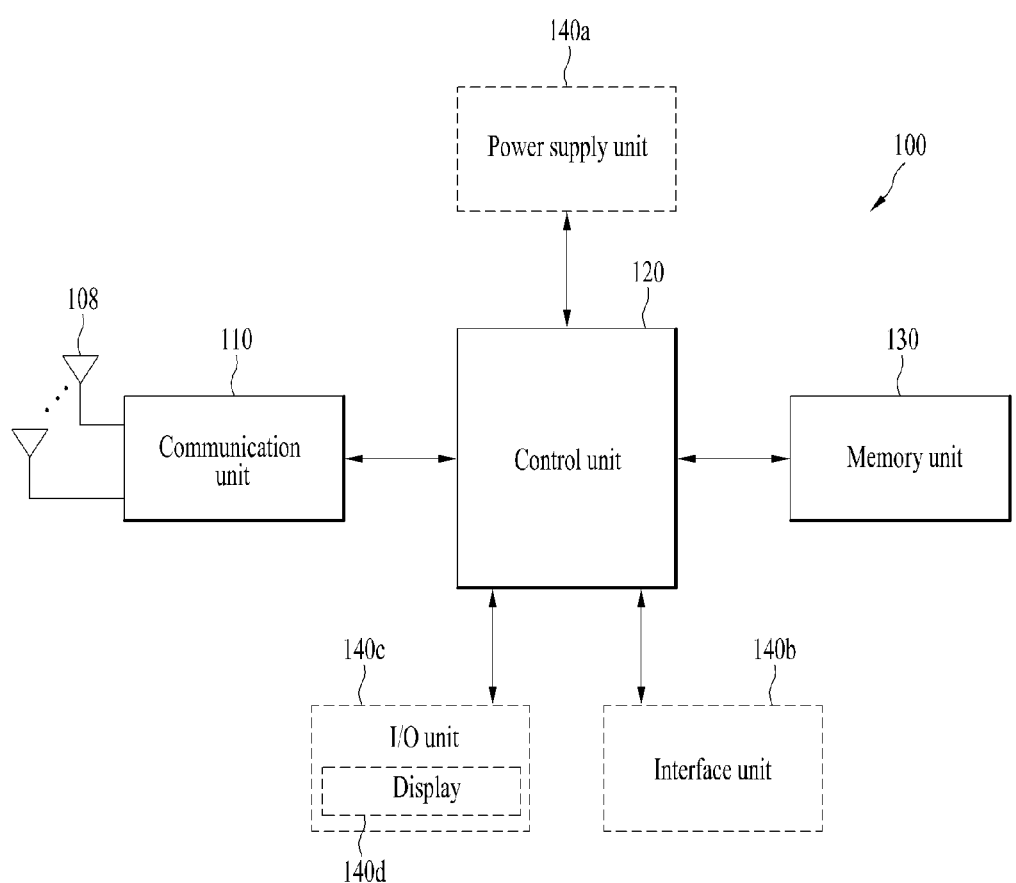
FIG. 23 is a diagram illustrating a portable device applied to various embodiments.

FIG. 23 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which Various Embodiments.

Figure 24:
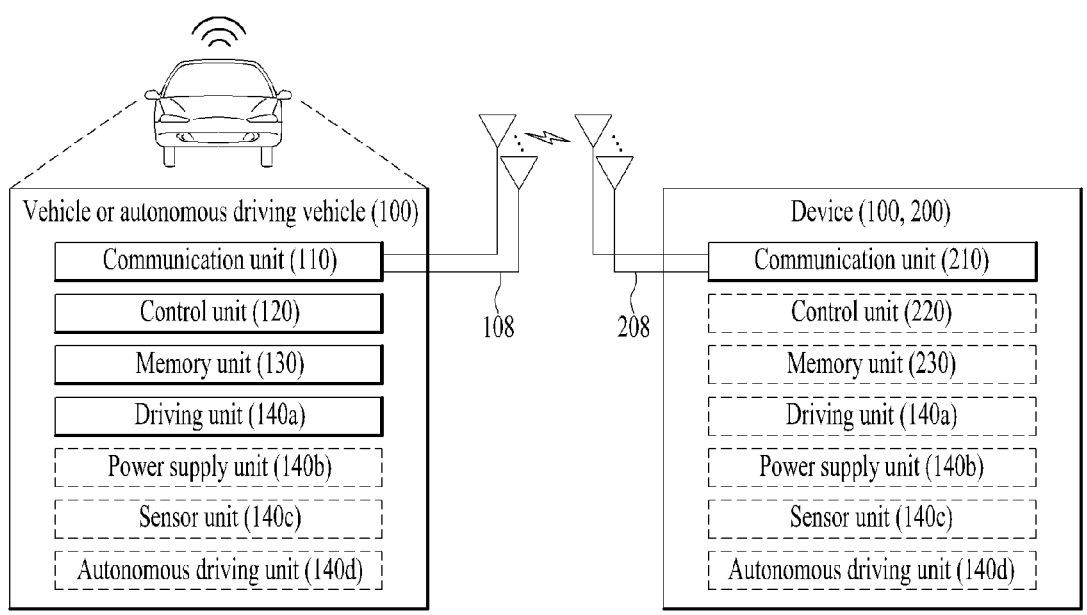
FIG. 24 is a diagram illustrating a vehicle or an autonomous driving vehicle applied to various embodiments.

FIG. 24 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus in a wireless communication system, the method comprising:
   transmitting a first message related to a random access procedure, wherein the first message comprises a physical random access channel (PRACH) preamble;
   receiving a second message related to the random access procedure in response to the first message, wherein the second message comprises first assistance data related to positioning;
   receiving a positioning reference signal (PRS) related to the first assistance data; and
   transmitting a third message related to the random access procedure,
   wherein the third message comprises information related to at least one measurement based on the PRS,
   wherein the third message is transmitted based on scheduling information for the third message, included in the second message,
   wherein the apparatus is configured in a radio resource control (RRC) idle state or RRC inactive state,
   wherein the information related to the at least one measurement based on the PRS is based on a reporting range defined by a predetermined first resolution for the RRC idle state or RRC inactive state within a predetermined range, and
   wherein a value of the first resolution is larger than a value of a second resolution predetermined for an RRC connected state.

2. The method according to claim 1, wherein the PRACH preamble is included in a plurality of PRACH preambles,
   wherein the plurality of PRACH preambles comprise: (i) at least one first PRACH preamble configured for at least one of a contention-based random access procedure or a contention-free random access procedure, and (ii) at least one second PRACH preamble configured for the positioning, and
   wherein the second message comprises the first assistance data based on the PRACH preamble being included in the at least one second PRACH preamble.

3. The method according to claim 2, wherein information related to a total number of PRACH preambles available for the contention-based random access procedure and the contention-free random access procedure is received in system information, and
   wherein the at least one second PRACH preamble is:
   at least a part of at least one PRACH preamble available for other purposes except for the total number of PRACH preambles, or
   at least a part of PRACH preambles available for the contention-free random access procedure among the total number of PRACH preambles.

4. The method according to claim 1, further comprising receiving, in system information, second assistance data for the positioning,
   wherein the first assistance data comprises information related to a change of a value of at least one of information element (IE) among IEs included in the second assistance data.

5. A user equipment (UE) configured to operate in a wireless communication system, the UE comprising:
   a transceiver; and
   at least one processor coupled with the transceiver,
   wherein the at least one processor is configured to:
   transmit a first message related to a random access procedure, wherein the first message comprises a physical random access channel (PRACH) preamble;
   receive a second message related to the random access procedure in response to the first message, wherein the second message comprises first assistance data related to positioning;
   receive a positioning reference signal (PRS) related to the first assistance data; and
   transmit a third message related to the random access procedure,
   wherein the third message comprises information related to at least one measurement based on the PRS,
   wherein the third message is transmitted based on scheduling information for the third message, included in the second message,
   wherein the apparatus is configured in a radio resource control (RRC) idle state or RRC inactive state,
   wherein the information related to the at least one measurement based on the PRS is based on a reporting range defined by a predetermined first resolution for the RRC idle state or RRC inactive state within a predetermined range, and wherein a value of the first resolution is larger than a value of a second resolution predetermined for an RRC connected state.

6. The UE according to claim 5, wherein the PRACH preamble is included in a plurality of PRACH preambles,
wherein the plurality of PRACH preambles comprise (i) at least one first PRACH preamble configured for at least one of a contention-based random access procedure or a contention-free random access procedure, and (ii) at least one second PRACH preamble configured for the positioning, and
wherein the second message comprises the first assistance data based on the PRACH preamble being included in the at least one second PRACH preamble.

7. The UE according to claim 6, wherein information related to a total number of PRACH preambles available for the contention-based random access procedure and the contention-free random access procedure is received in system information, and
wherein the at least one second PRACH preamble is:
at least a part of at least one PRACH preamble available for other purposes except for the total number of preambles, or
at least a part of PRACH preambles available for the contention-free random access procedure among the total number of PRACH preambles.

8. The UE according to claim 5, wherein the at least one processor is further configured to receive, in system information, second assistance data for the positioning, and
wherein the first assistance data comprises information related to a change of a value of at least one information element (IE) among IEs included in the second assistance data.

9. The UE according to claim 5, wherein the at least one processor is further configured to communicate at least one of a mobile terminal, a network, or an autonomous driving vehicle other than a vehicle comprising the UE.

10. A base station (BS) configured to operate in a wireless communication system, the BS comprising:
a transceiver; and
at least one processor coupled to the transceiver,
wherein the at least one processor is configured to:
receive a first message related to a random access procedure, wherein the first message comprises a physical random access channel (PRACH) preamble;
transmit a second message related to the random access procedure in response to the first message, wherein the second message comprises first assistance data related to positioning;
transmit a positioning reference signal (PRS) related to the first assistance data; and
receive a third message related to the random access procedure,
wherein the third message comprises information related to at least one measurement based on the PRS,
wherein the third message is received based on scheduling information for the third message, included in the second message,
wherein the apparatus is configured in a radio resource control (RRC) idle state or RRC inactive state,
wherein the information related to the at least one measurement based on the PRS is based on a reporting range defined by a predetermined first resolution for the RRC idle state or RRC inactive state within a predetermined range, and
wherein a value of the first resolution is larger than a value of a second resolution predetermined for an RRC connected state.

* * * * *